(12) United States Patent
Thekadath et al.

(10) Patent No.: US 11,323,457 B2
(45) Date of Patent: May 3, 2022

(54) NETWORK TOPOLOGY

(71) Applicant: Visa International Service Association, San Francisco, CA (US)

(72) Inventors: Ajith Thekadath, Foster City, CA (US); Suman Mukherjee, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 9 days.

(21) Appl. No.: 16/895,805

(22) Filed: Jun. 8, 2020

(65) Prior Publication Data

US 2020/0304518 A1 Sep. 24, 2020

Related U.S. Application Data

(63) Continuation of application No. 16/318,357, filed as application No. PCT/US2017/046364 on Aug. 10, 2017, now Pat. No. 10,715,531, which is a continuation-in-part of application No. 15/283,930, filed on Oct. 3, 2016, now Pat. No. 10,693,658.

(60) Provisional application No. 62/490,487, filed on Apr. 26, 2017.

(51) Int. Cl.
*H04L 29/06* (2006.01)
*H04L 9/32* (2006.01)
*H04L 9/08* (2006.01)

(52) U.S. Cl.
CPC .......... *H04L 63/123* (2013.01); *H04L 9/0825* (2013.01); *H04L 9/3221* (2013.01); *H04L 9/3239* (2013.01); *H04L 9/3247* (2013.01); *H04L 63/08* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 7,640,187 B1 | 12/2009 | Sonderegger et al. | |
| 9,704,158 B2 | 7/2017 | Dundas et al. | |
| 10,097,344 B2 | 10/2018 | Davis | |
| 10,417,217 B2 | 9/2019 | Pierce et al. | |
| 10,523,443 B1 * | 12/2019 | Kleinman | H04W 12/06 |

(Continued)

FOREIGN PATENT DOCUMENTS

| | | |
|---|---|---|
| CN | 104969508 | 10/2015 |
| CN | 105975868 | 9/2016 |

(Continued)

OTHER PUBLICATIONS

U.S. Appl. No. 15/283,930, "Final Office Action", dated Oct. 12, 2018, 13 pages.

(Continued)

*Primary Examiner* — Benjamin E Lanier
(74) *Attorney, Agent, or Firm* — Kilpatrick Townsend & Stockton LLP

(57) ABSTRACT

A network topology is provided that includes multiple data centers for building blockchain blocks. The data centers can process different subgroups of blocks, and then send updates to one another with information about new blocks. Additionally, some data centers may protect sensitive block body information, and instead may only share block headers.

19 Claims, 11 Drawing Sheets

(56) References Cited

U.S. PATENT DOCUMENTS

| | | | |
|---|---|---|---|
| 10,715,531 | B2 | 7/2020 | Thekadath et al. |
| 2002/0057712 | A1 | 5/2002 | Moriwaki et al. |
| 2002/0174066 | A1 | 11/2002 | Kleckner et al. |
| 2003/0158820 | A1 | 8/2003 | Mathur et al. |
| 2004/0233865 | A1 | 11/2004 | Adkisson et al. |
| 2005/0177518 | A1 | 8/2005 | Brown |
| 2005/0182710 | A1 | 8/2005 | Andersson et al. |
| 2007/0140157 | A1 | 6/2007 | Fu et al. |
| 2013/0041770 | A1 | 2/2013 | Raman et al. |
| 2015/0206106 | A1 | 7/2015 | Yago |
| 2015/0206124 | A1 | 7/2015 | Aubin et al. |
| 2015/0294308 | A1 | 10/2015 | Pauker et al. |
| 2015/0332283 | A1 | 11/2015 | Witchey |
| 2016/0028552 | A1 | 1/2016 | Spanos et al. |
| 2016/0125040 | A1 | 5/2016 | Kheterpal et al. |
| 2016/0191243 | A1 | 6/2016 | Manning |
| 2016/0210626 | A1 | 7/2016 | Ortiz et al. |
| 2016/0218879 | A1 | 7/2016 | Ferrin |
| 2016/0253663 | A1 | 9/2016 | Clark et al. |
| 2016/0261685 | A1 | 9/2016 | Chen et al. |
| 2016/0283920 | A1 | 9/2016 | Fisher et al. |
| 2016/0284033 | A1* | 9/2016 | Winand ........... G06Q 10/06315 |
| 2016/0332283 | A1 | 11/2016 | Liu |
| 2017/0048235 | A1 | 2/2017 | Lohe et al. |
| 2017/0075938 | A1* | 3/2017 | Black ..................... G06F 21/64 |
| 2017/0132621 | A1 | 5/2017 | Miller et al. |
| 2017/0180134 | A1 | 6/2017 | King |
| 2017/0213289 | A1 | 7/2017 | Doney |
| 2017/0236120 | A1 | 8/2017 | Herlihy et al. |
| 2017/0237554 | A1 | 8/2017 | Jacobs et al. |
| 2017/0237570 | A1 | 8/2017 | Vandervort |
| 2017/0323294 | A1 | 11/2017 | Rohlfing et al. |
| 2018/0158162 | A1 | 6/2018 | Ramasamy |
| 2018/0204191 | A1 | 7/2018 | Wilson et al. |

FOREIGN PATENT DOCUMENTS

| | | |
|---|---|---|
| JP | 2008257598 | 10/2008 |
| KR | 1020030084294 | 11/2003 |
| WO | 2015175722 | 11/2015 |
| WO | 2017006134 | 1/2017 |
| WO | 2017139112 | 8/2017 |
| WO | 2018067232 | 4/2018 |
| WO | 2018085558 | 5/2018 |

OTHER PUBLICATIONS

U.S. Appl. No. 15/283,930 , "Non-Final Office Action", dated Jun. 21, 2018, 14 pages.

PCT/US2017/015498 , "International Preliminary Report on Patentability", dated Aug. 23, 2018, 10 pages.

PCT/US2017/015498 , "International Search Report and Written Opinion", dated Apr. 28, 2017, 15 pages.

PCT/US2017/046364 , "PCT Search Report", dated Nov. 8, 2017, 10 pages.

Consensys , "Linking the Chains with BTC Relay", Retrieved from the Internet URL:https:jjmedia.consensys.net/linking-the-chains-with-btc-relay-5ffd2c8248 [Retrieved on Aug. 28, 2019], Jun. 5, 2016.

Anonymous, basecoin/ibc.md at mastertindermint/basecoin/blob/master/docs/guide/ibc.md, Jun. 29, 2017 XP05516293, Retrieved from the Internet URL:https://githum.com/tendermint/basecoin/blob/master/docs/guide/ibc.md [retrieved on Aug. 28, 2019] *pp. 5, 5,6 *.

EP17858854.7 , "Extended European Search Report", dated Sep. 5, 2019, 7 pages.

U.S. Appl. No. 16/318,357 , Notice of Allowance, dated Mar. 13, 2020, 15 pages.

Application No. PCT/US2017/046364 , International Preliminary Report on Patentability, dated Apr. 18, 2019, 7 pages.

Application No. EP17585854.7, Office Action, dated Nov. 27, 2020.

Application No. EP17858854.7 , Notice of Decision to Grant, dated Apr. 15, 2021, 2 pages.

Application No. CN201780054059.0 , Office Action, dated Jul. 27, 2021, 14 pages.

Application No. EP21173425.6 , Extended European Search Report, dated Aug. 16, 2021, 8 pages.

Gaetani et al., "Blockchain-Based Database To Ensure Data Integrity In Cloud Computing Environments", Proceedings of the First Italian Conference on Cybersecurity, Jan. 1, 2017, 10 pages.

IN201947014010 , "First Examination Report", dated Aug. 30, 2021, 6 pages.

Application No. MX/A/2019/003721 , Notice of Allowance, dated Jul. 8, 2021, 3 pages.

Application No. MX/A/2019/003721 , Office Action, dated Mar. 30, 2021, 6 pages.

AU2017340233 , "First Examination Report", dated Dec. 15, 2021, 3 pages.

Application No. CN201780054059.0 , Notice of Decision to Grant, dated Mar. 15, 2022, 8 pages.

Liu et al., "Time-Release Protocol From Bitcoin And Witness Encryption For Sat", Korean Circulation Journal, Dec. 31, 2015, 3 pages.

* cited by examiner

NETWORK TOPOLOGY

CROSS REFERENCE TO RELATED APPLICATIONS

This application is a continuation of U.S. application Ser. No. 16/318,357, filed on Jan. 16, 2019, which is a 371 patent application of international patent applcation number PCT/US2017/046364, international filing date of Aug. 10, 2017, which claims the benefit of the filing date of U.S. Provisional Application No. 62/490,487, filed on Apr. 26, 2017, which are herein incorporated by reference in its entirety for all purposes.

This application is also a continuation-in-part of U.S. patent application Ser. No. 15/283,930, filed Oct. 3, 2016, which claims the benefit of U.S. Provisional Patent Application No. 62/294,825, filed Feb. 12, 2016, the contents of which are all herein incorporated by reference in their entirety for all purposes.

BACKGROUND

Many networks and applications exist for transferring information and assets. For example, there are networks designed for transferring access credentials, event tickets, property rights, currency, game credits, mobile phone minutes, digital media, etc. Additionally, there are often multiple networks for transferring the same type of asset. For example, if someone wants to transfer an event ticket to a friend, they can choose one of several ticket transfer networks and applications.

It can be beneficial to unify and simplify many types of transfer networks. For example, if all asset transfer networks for transferring mobile phone minutes were combined into a single, global network, it could simplify the transfer process. Participants could have just one application which is configured for one network. Additionally, it could simplify record keeping, as one network could keep track of where assets have been moved.

However, unifying transfer networks can present new problems. For example, coordinating all transfers can be a large task, and may be too large a burden for a network administrator. Additionally, the network administrator may be able to view the details of every transfer. This can limit privacy for network participants, and may provide too much power to the network administrator.

Embodiments of the invention address these and other problems individually and collectively.

SUMMARY

One embodiment of the invention is directed to a method. The method comprises creating, by the first data center computer, a first block for a first blockchain. The first block includes a first block header and first block body. The method also includes sending a message to a second data center computer indicating that the first block was created for the first blockchain. The message includes the first block header but not the first block body. The second data center computer adds the first block header to a second blockchain, and does not add the first block body to the second blockchain.

Another embodiment of the invention is directed to a first data center computer configured to perform the above-described method.

Another embodiment of the invention is directed to a method comprising creating, by a first data center computer, a first block for a first blockchain. The first block includes a first block header and first block body. The method also includes sending a first message to a second data center computer indicating that the first block was created for the first blockchain. The message includes the first block header but not the first block body. The method further comprises receiving, by a second data center computer, the first message indicating that the first block was created for the first blockchain. The second data center computer can also create a second block for a second blockchain. The second block includes a second block header that is the same as the first block header, and the second block does not include the first block body.

Another embodiment of the invention is directed to a system including a first data center computer and a second data center computer configured to perform the above-described method.

Further details regarding embodiments of the invention can be found in the Detailed Description and the Figures.

DETAILED DESCRIPTION

Figure 1:
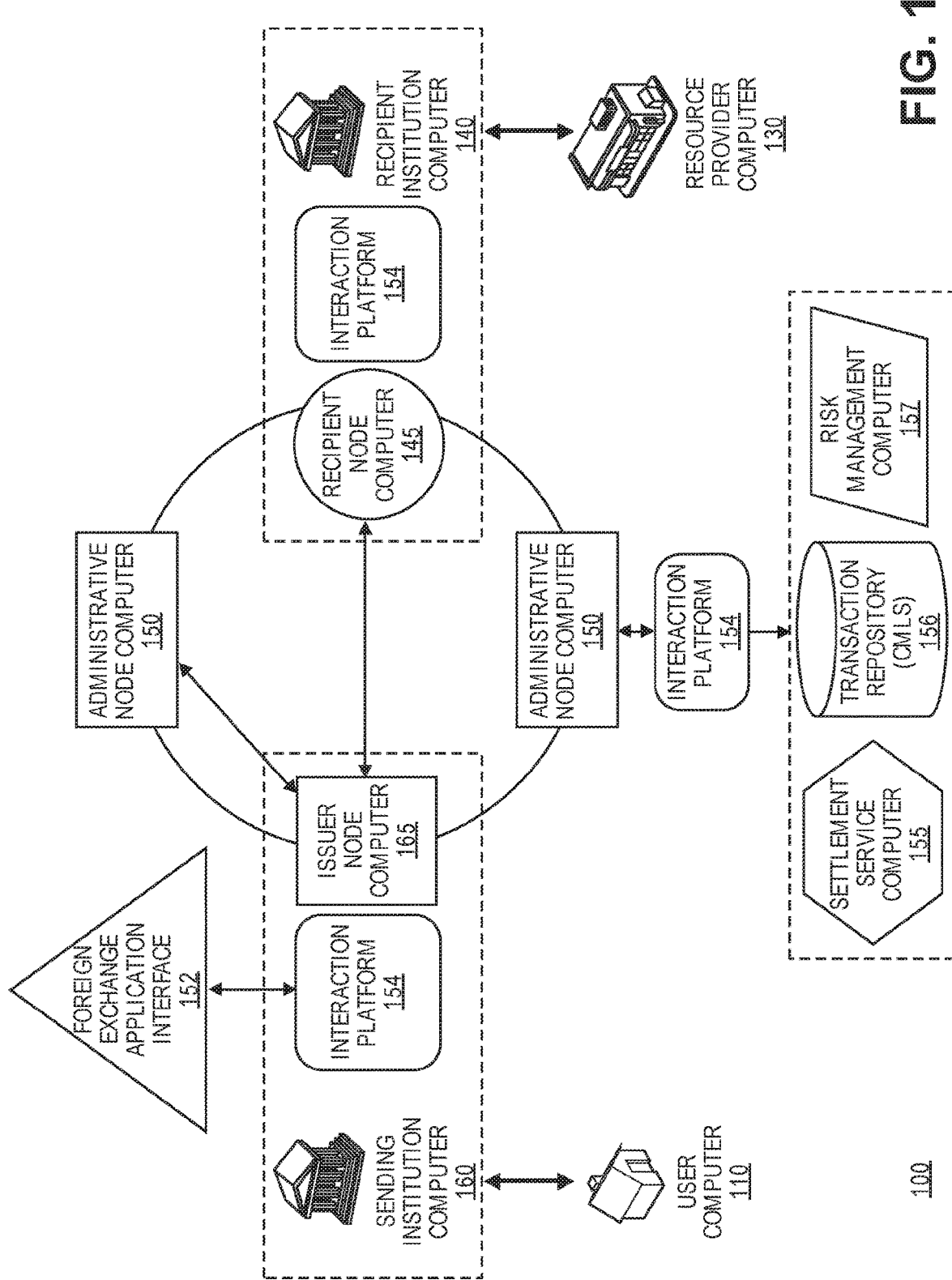
FIG. 1 shows a block diagram of a system according to an embodiment of the invention.

Embodiments of the present invention are directed to a system and method for processing data elements using multiple data centers. Utilizing multiple data centers and load balancing techniques can distribute the processing burden and improve transfer efficiency.

Additionally, each data center can maintain a separate network record, which can be in the form of a blockchain ledger. The data centers can update one another about respective data elements which they have processed and/or blocks which they have created. As a result, even though the data element submission processes and record keeping processes are distributed, data centers can synchronize their records, effectively acting as a broad, single network.

Separating administration of a network among multiple data centers can enable the use of special, localized configurations, rules, and data restrictions. For example, in some embodiments, a certain data center may not share meaningful data element information or block bodies with other data centers, but may still share record identifiers (e.g., block headers) or other nondescript data element labels with other data centers (e.g., as record updates). As a result, sensitive record information can be contained and protected, improving privacy for participants using that data center.

Embodiments of the invention can be applied to transferring value in an asset transfer network. The asset transfer network can be a universal network with which participating entities can be directly enrolled. A universal network can allow a sending financial institution to communicate with and provide value (e.g., a digital asset) directly to any recipient financial institution associated with the network. A digital asset can be a promise of value, and the value may be settled at a later time. A universal network can also allow for unique identification of each enrolled entity (e.g., by distributing of unique identifiers to each entity during enrollment).

In some embodiments, the asset transfer network can be a permissioned network that only allows validated entities to participate in the network. For example, a central network administrator can validate financial institutions and other entities during enrollment. During validation, the administrator can ensure that enrolling entities are legitimate organizations that are screened for compliance to network rules. The administrator can also implement standardized messaging procedures and communicate those procedures to enrolled entities.

Digital assets associated with a value transfer can, in some embodiments, be digitally signed by a sending entity and/or an administrative entity. The sender's signature can indicate that the digital asset was legitimately sent by the indicated sender, and the administrator's signature can indicate that the digital asset was approved and/or recorded by the administrator. In some embodiments, a digital signature can indicate that the digital asset has been transferred, and that the value cannot be taken back.

Some embodiments include a central settlement entity. The central settlement entity may allow value to be settled efficiently from a sending account at a sending financial institution to a recipient account at a recipient financial institution. A central settlement entity may include a central financial institution with multiple locations and multiple accounts). The central settlement entity may have at least one location and one account in each country that it operates. As a result, the first financial institution can have an account (e.g., a settlement account) with the central settlement entity in a first country, and the second financial entity can have an account with the central settlement entity in a second country. Accordingly, in some embodiments, an international transfer can take place by transferring from the first financial institution to the central settlement entity, and then from the central settlement entity to the second financial institution. This means that, in some embodiments, each financial institution that participates in the asset transfer network may only have one external account with the central settlement entity (e.g., instead of multiple correspondent banking relationships). In some embodiments, the central settlement entity may only have one location instead of having different branches in different countries. In this case, financial institutions in other countries may still maintain correspondent accounts with the central settlement entity (e.g., nostro accounts). Additionally, in some embodiments, each financial institution can have different accounts at the central settlement entity for different currencies (e.g., 1, 5, 10, 20, or 100 accounts, each holding a different type of currency). As a result, the financial institution can settle transactions with other financial institutions using the best suitable currency, or a currency that both financial institutions have.

As can be seen, embodiments provide an asset transfer network with improved speed, security, reliability, transparency, and efficiency. For example, a universal and permissioned network can be well-organized, and can enable efficient messaging and transfers directly between a sender and a recipient, regardless of location. This organization can reduce the extra communications, as well as remove the mystery of various unknown correspondent bank relationships, present in decentralized legacy systems.

Central enrollment, compliance-screening of participating entities, standardized communications, and universal identifiers that uniquely identify entities can each facilitate a sense of trust in the network and the participating entities. A distributed ledger can instill confidence that each participating entity has the same information about agreements and transfers that have been made. Similarly, digitally signed digital assets can be highly trusted, as the signatures can be validated to confirm that a digital asset is legitimately being transferred.

The high level of network trust and digitally signed digital assets can allow recipient financial institutions to make a received digital asset value immediately available in the recipient account, even if the value as not yet been settled. This means that a transferred value can be available almost immediately.

In embodiments of the invention, to initiate an asset transfer, a user (or an institution representing the user) can instruct an issuer node in the asset transfer network to generate and provide the digital asset. The issuer node can generate and digitally sign the digital asset. The issuer node can also obtain approval and a second digital signature from an administrative node (e.g., a central administrator for the network). Then, the issuer node can provide the digital asset to a recipient node (e.g., directly, or through network-wide distribution). The recipient node can then provide the digital asset to the recipient (or an institution representing the recipient).

In alternative embodiments, the digital asset can be generated and/or signed by an interaction platform (instead of the issuer node). The interaction platform can then provide the prepared digital asset to the issuer node or administrative node for distribution within the asset transfer network.

In either case, a single push-type message can be used to provide a digital asset. This single message can have enough information and be trusted enough to replace one or more traditional transfer messages (e.g., an authorization request message, an authorization response message, clearance messages, and/or multiple intermediary correspondent bank transfer messages), thereby improving messaging efficiency.

Embodiments allow for any suitable type of value to be sent in a digital asset. For example, a digital asset can represent a promise of monetary value, so the digital asset can be used to make a payment. Additionally, a digital asset can be used to provide access rights, such as an access entry code for a restricted area, tickets to an event, login credentials for accessing secured information, etc. A digital asset can also be used to transfer ownership, such as property deeds, vehicle pink slips, patent holdings, as well as to provide credit, such as game credit, energy credits, mobile phone minutes, and/or for any other suitable purpose.

Accordingly, embodiments of the invention provide an asset transfer platform that enables direct and predictable exchange of value (e.g., value represented by account data, cryptographically signed digital assets, and supporting instructions). The platform further provides compliance screening of participants (e.g., banks and their clients). In some embodiments, screening information about users is obtained from banks or other service providers. Additionally, embodiments utilize smart contracts that can automatically and forcibly settle digital assets according to certain criteria (e.g., forcibly settle after digital asset has been distributed in network for 24 hours). For example, a financial institution may, during registration, agree to having a smart contract established when a digital asset is requested or generated.

Prior to discussing specific embodiments of the invention, some terms may be described in detail.

A "data element" may refer to digital information. For example, a data element can be information that exists in binary format. In some embodiments, a data element can include information about anything that can be described in a record. For example, a data element can include any suitable type of digital information, such as medical data, biometric data, ownership data, academic credentials, product data, etc. A data element can also be used to describe an update, a change, or a request. For example, a data element can include digital information about a change in a person's medical status, an update about the number of sick days an employee has used, a request to validate or approve of a value transfer, or a promise to transfer a value from one entity to another. One example of a data element is a digital asset.

A "digital asset" may refer to digital content associated with a value. In some cases, the digital asset may also indicate a transfer of the value. For example, a digital asset may include data that indicates a transfer of a currency value (e.g., fiat currency or crypto currency). In other embodiments, the digital asset may correspond to other non-currency values, such as access privileges data (e.g., a number of authorized usages or a time allotment for accessing information) and ownership data (e.g., digital right data).

In some embodiments, a digital asset may be considered a trustworthy guarantee that a value will be provided (e.g., a reliable IOU). For example, providing a digital asset to a recipient may be considered a promise that is reliable enough to replace authorization request/response messages and/or clearance messages during a transaction.

A digital asset may also include information about one or more digital asset attributes. For example, a digital asset may include information useful for transferring value from one entity or account to another. A digital asset may also include remittance information (e.g., information identifying a sending entity). In some embodiments, a digital asset may include one or more of a digital asset identifier, a value (e.g., an amount, an original currency type, a destination currency type), transfer fee information, a currency exchange rate, an invoice number, a purchase order number, a timestamp, a sending entity identifier (e.g., a sender enterprise ID), a sending entity account number, a sending entity name, sending entity contact information (e.g., an address, phone number, email address, etc.), sending institution information (e.g., a financial institution name, enterprise ID, and BIN), a recipient entity identifier (e.g., a recipient enterprise ID), a recipient entity account number, a recipient entity name, recipient entity contact information (e.g., an address, phone number, email address, etc.), and/or recipient institution information (e.g., a financial institution name, enterprise ID, and BIN). When a digital asset is received, the recipient may have sufficient information to proceed with a settlement transaction for the indicated value.

In some embodiments, a digital asset may also include digital signatures and/or encryption keys for validation and entity identification. For example, a digital asset may include an issuer node's digital signature and public key, as well as an administrative node's public key.

An "asset transfer network" may be a network for providing and/or receiving digital assets. An asset transfer network may provide infrastructure for providing digital assets in "push" messages. An asset transfer network can comprise one or more types of nodes. In some embodiments, digital assets transmitted in an asset transfer network may be recorded in a ledger of transactions. An example of an asset transfer network is a blockchain network, where a ledger of transactions can take the form of a blockchain.

The term "node" may refer to a connection point. In some embodiments, a node may be a physical electronic device that is capable of creating, receiving, or transmitting data. In other embodiments, a node may be a software module on a computing device, the software module a connection point in a communication network. In some embodiments, a node may be a computing device within an asset transfer network. A node may be able to mint an asset, transfer an asset, receive an asset, validate an asset, maintain a ledger of transactions, and/or perform any other suitable functions. Different types of nodes may be able to perform different sets of functions within an asset transfer network. In some embodiments, a node may be associated with and/or operated by a financial institution computer (e.g., a bank), a payment processor computer, a third party computer, or any other suitable entity.

A "record" may refer to evidence of a data element. A digital record can be electronic documentation of a data element. A record can include a record identifier and record information. For example, record information can include information a data element (e.g., a digital asset) and/or information about the data element (e.g., a digital signature associated with the digital asset). A record identifier can be a number, title, or other value used for identifying a record. A record identifier can be nondescript, in that it may not provide any meaningful information about the record information in the record. Examples of records include medical records, academic records, transaction records within a ledger of transactions, etc. Another example of a record is a block in a blockchain. An individual block can be an individual record, and a blockchain can be a series of records. A blockchain header is an example of a record identifier, and a blockchain body is an example of record information.

The term "ledger of transactions" may refer to a compilation of data from previous transactions. The ledger of transactions may be a database or other comparable file structure that may be configured to store data from all previous digital asset transfers, including the date and time of the transfer, the transfer amount, and identification information for the participants of the transfer (e.g., the sender and the receiver of the transfer amount). In some embodiments, the ledger of transactions may be in the form of an electronic ledger (e.g., blockchain) in which data already stored in the electronic ledger is unalterable. In some embodiments, each node within an asset transfer network may store their own copy of the ledger of transactions. In other embodiments, only some nodes store their own copy of the ledger of transactions. In further embodiments, some nodes may have a restricted view of the ledger of transactions. For example, some nodes may only be able to view and/or verify transactions to which they were a party.

A ledger of transactions may include transaction records that are digitally signed (e.g., with a private key) in order to protect the transaction entries in the ledger from being doctored with false transaction data. This can prevent double spending and make all transactions immutable and irreversible, and therefore make the ledger trustworthy.

In some embodiments, a ledger of transactions can be publicly viewable. For example, one or more entities may have access to the ledger, and may be able to consult the ledger to determine whether a certain transaction actually took place, or whether a certain value is authentic. In some embodiments, the ledger may only be partially viewable to one or more entities.

As used herein, a "blockchain" may comprise a series of blocks. Each block in the blockchain may include an electronic record of one or more historical transactions, as well as metadata. In some embodiments, blocks in the blockchain can be linked by including a reference to the previous block (e.g., a hash output of a previous block). Each new block in the blockchain may be algorithmically determined based on new transactions and previous blocks in the blockchain. As a result, any tampering of data stored in these previous blocks can be detected.

A block can include both a "block body" and a "block header." The block header can be a block identifier or label. The block header can serve to identify the block, and block headers can be used to link blocks together. The block body can include the information stored in the block. For example, record information stored in a block can be considered the block body. The block body can also include other data, such as reference to a previous block (e.g., a previous block header), a timestamp, a random number, a hash of record information (e.g., transaction data), and/or any other suitable information. In some embodiments, the block body can be all block data besides the block header. A block header can be created based on the block body. For example, some or all of the block body information can be used as inputs in a hashing algorithm, encrypted, or otherwise manipulated to create a block header. A previous block can be linked to a current block by using the previous block header as in input when generating the current block header.

An "enterprise ID" may include an identifier for a person, business, institution, or any other suitable entity. In some embodiments, an enterprise ID may be a globally unique identifier. For example, enterprise IDs may be issued by a central, trusted entity. An enterprise may include alphanumeric characters, special characters, and any other suitable symbol. In some embodiments, an enterprise ID can be a one-time-use identifier, refreshed after each transaction. In some embodiments, an enterprise ID may be used as an address for receiving a digital asset transfer (e.g., an enterprise ID may be associated with an account).

A "key pair" may include a pair of linked encryption keys. For example, a key pair can include a public key and a corresponding private key. In a key pair, a first key (e.g., a public key) may be used to encrypt a message, while a second key (e.g., a private key) may be used to decrypt the encrypted message. Additionally, a public key may be able to authenticate a digital signature created with the corresponding private key. The public key may be distributed throughout a network in order to allow for authentication of messages signed using the corresponding private key. Public and private keys may be in any suitable format, including those based on RSA or elliptic curve cryptography (ECC). In some embodiments, a key pair may be generated using an asymmetric key pair algorithm. However, a key pair may also be generated using other means, as one of ordinary skill in the art would understand.

The term "digital signature" may refer to an electronic signature for a message. A digital signature may be a numeric value, an alphanumeric value, or any other type of data including a graphical representation. A digital signature may be a unique value generated from a message and a private key using an encrypting algorithm. In some embodiments, a validation algorithm using a public key may be used to validate the signature.

The term "zero-knowledge proof" or "zero-knowledge protocol" may refer to a method of proving information is true without conveying the actual information itself. In a zero-knowledge protocol, secret information can be verified without being revealed. More information regarding zero-knowledge proofs may be found at:

J. Camenisch and M. Stadler. Proof systems for general statements about discrete logarithms. Technical Report TR 260, Institute for Theoretical Computer Science, ETH Zürich, March 1997.

In some embodiments, the verification of an obscured or partially obscured transaction ledger may employ a zero-knowledge protocol.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

FIG. 1 shows a system 100 comprising a number of components. The system comprises a user computer 110 operated by a user (not shown). The user computer 110 may be in communication with a sending institution computer 160, which may be associated with an issuer node computer 165. The system 100 also comprises a resource provider computer 130 associated with a resource provider (not shown). The resource provider computer 130 may be in communication with a recipient institution computer 140, which may be associated with a recipient node computer 145. The system further comprises an interaction platform 154, one or more administrative node computers 150, a foreign exchange transaction application interface 152, a settlement service computer 155, a transaction repository 156, and a risk management computer 157. Each of the entities shown in FIG. 1 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The system 100 may be used to process, approve, and record any suitable type of data element. Individuals, organizations, and any other suitable entity can submit requests for processing and approving data elements, and records can be created and updated for the data elements.

For the sake of explanation, the system 100 is primarily described below as system that allows individuals, businesses, and other entities to transfer value to one another. The system 100 can use "push" transaction messages that are digitally signed and verified by a trusted central entity. The transactions can also be recorded in a trusted ledger (e.g., a blockchain). As a result, the push messages can be trusted and relied on. The push messages can serve as a replacement for typical authorization request messages, authorization response messages, and/or clearing messages.

The system 100 may include a network of nodes, such as the administrative node computer 150, the issuer node computer 165, and the recipient node computer 145. These nodes may, in combination, comprise an asset transfer network (e.g., a blockchain network). Such an asset transfer network can be used for providing any suitable type of digital asset, such as a payment digital asset (e.g., for transfer of monetary value) or an access digital asset (e.g., for transfer for access privileges).

As an example, the system 100 can serve as a transaction system for providing payments. For the sake of explanation, the entire system 100 may be referred to as a transaction system, and a central network of nodes (e.g., one or more recipient node computers 145, one or more administrative node computers 150, and one or more issuer node computers 165) can be referred to as an asset transfer network.

In such a transaction system, the user can provide a payment to the resource provider. To do so, the user computer 110 may instruct the sending institution computer 160 to transfer value from a user account at the sending institution computer 160. The sending institution computer 160 can then interact with the asset transfer network and request that a digital asset is sent to the resource provider. A digital asset may be a highly-trusted promise of a value transfer. Accordingly, when the recipient institution receives an official digital asset associated with the asset transfer network, the recipient institution may be informed and guaranteed that value will be transferred from the user's account to the resource provider's account. The value can be settled between the accounts at a later time (e.g., through settlement account at a central settlement bank).

For the sake of description, the system 100 shows the examples of the user (associated with the user computer 110) and the resource provider (associated with the resource provider computer 130). Embodiments also allow value to be sent to and from any suitable entity. For example, the system 100 can host business-to-business payments, peer-to-peer payments, and any other suitable type of transfer.

In order to participate in the system 100, the user may enroll. For example, the user may (via the user computer 110 and/or an interface provided by the sending institution computer 160) enroll with the asset transfer network. Asset transfer network enrolling services may be provided by the interaction platform 154 and/or the administrative node computer 150. An asset transfer network administrator (e.g., interaction platform 154) may associate an enterprise ID with the user, the user computer 110, or the user account. In some embodiments, the sending institution computer 160 may obtain an enterprise ID from the interaction platform 154 on behalf of the user.

The sending institution computer 160 may store value on behalf of the user. The sending institution computer 160 may also be able to provide value (e.g., provide a payment) on behalf of the user. An example of a sending institution may be an issuer, which may typically refer to a business entity (e.g., a bank) that issues and maintains an account (e.g., a bank account) for a user.

A user account at the sending institution computer 160 may be associated with various user information. For example, a user transaction account may be associated with a first name, a last name, a government-issued identification number such as a driver's license number, passport number, or social security number, a date of birth, a residential and/or business address, a phone number, an account username, an account password, an email address, etc.

The sending institution computer 160 may also enroll with the asset transfer network (e.g., via the administrative node computer 150 or the interaction platform 154) in order to interact with the network. As a result, the sending institution computer 160 may also receive a unique enterprise ID.

In some embodiments, the sending institution computer 160 may also receive a key pair. Such a key pair may be stored in a hardware security module (HSM). In some embodiments, the sending institution computer 160 may maintain its own HSM. Alternatively, the sending institution computer 160 key pair may be stored in another entity's HSM (e.g., an HSM at the issuer node computer 165 or the administrative node computer 150).

The sending institution computer 160 may be associated with and/or represented by the issuer node computer 165, which may be able to provide payments (e.g., via digital assets) in the asset transfer network on behalf of the sending institution computer 160.

As explained in more detail below, embodiments provide several ways for the sending institution computer 160 to interact with the asset transfer network to request a value transfer. For example, in some embodiments, the sending institution computer 160 may work closely with the interaction platform 154, which may generate digital assets and interact with the asset transfer network on behalf of the sending institution computer 160. In such a scenario, the sending institution computer 160 may instruct the interaction platform 154 to initiate a value transfer from the user account to the resource provider account. The interaction platform 154 may then generate the digital asset, digitally sign the digital asset (e.g., with one or more digital signatures based on one or more private keys), and then provide the digital asset to the asset transfer network (e.g., the administrative node computer 150 or the issuer node computer 165). The digital asset may then be distributed within the asset transfer network and recorded.

In an alternative example, the sending institution computer 160 may instead work more closely with an issuer node computer 165 that represents the sending institution computer 160. The issuer node computer 165, instead of the interaction platform 154, may generate and sign digital assets on behalf of the sending institution computer 160. However, in some embodiments, the interaction platform 154 may still play a role by providing an interface for the sending institution computer 160 to communicate with the issuer node computer 165. In this scenario, the sending institution computer 160 may instruct the issuer node computer 165 to initiate a value transfer from the user account to the resource provider account. The issuer node computer 165 may then generate a digital asset indicating a transfer of funds from the user to the resource provider. The issuer node computer 165 may digitally sign the digital asset, obtain a second digital signature from the administrative node computer 150, and provide the digital asset to the recipient node computer 145. The recipient node computer 145 may provide the digital asset to the recipient institution computer 140.

In other embodiments, the sending institution computer 160 may directly manage and control the issuer node computer 165, or may have white-label access to the asset transfer network (e.g., the issuer node computer 165 can be provided by another entity, but can be used by the sending institution computer 160 for transactions). In any case, there may be a way for the sending institution computer 160 to access the network and initiate transactions.

The interaction platform 154 may include one or more server computers. As mentioned above, the interaction platform 154 may facilitate interaction between the asset transfer network and the financial institutions (e.g., the sending institution computer 160 and the recipient institution computer 140). For example, the interaction platform 154 may include a platform and interface (e.g., an application interface) that allows the financial institutions and users to access the asset transfer network (e.g., communicate with nodes in the network)

Embodiments allow the interaction platform 154 to take a more active role by performing tasks such as enrolling users, generating digital assets, signing digital assets, maintain transaction records, etc. Other embodiments allow the interaction platform 154 to take a more passive role by performing less tasks, and instead acting primarily as a communication interface between the asset transfer network and the financial institutions.

The interaction platform 154 may allow users (via the user computer 110) and financial institutions to enroll for participating with the asset transfer network and set up a profile. The interaction platform 154 may also provide an interface where users and financial institutions can initiate a transaction, as well as view foreign exchange rates and transfer fees, and receive reconciliation information for a transaction.

The interaction platform 154 may also maintain a record of transactions that have taken place (e.g., a list of transactions or a blockchain-type ledger). Further, the interaction platform 154 may perform analytics of user and bank behavior. Users and financial institutions may be allowed to view analytics, view a global directory, and view network compliance information.

As described above, the interaction platform 154 may also perform a number of services related to generating assets, digitally signing assets, storing transactions records, and any other suitable service. However, these services will instead be described further below with respect to the administrative node computer 165. This is because, in some embodiments, some or all of the functionality described below with respect to the administrative node computer 150 may instead be performed by the interaction platform 154. Similarly, some or all of the functionality with respect to the interaction platform 154 may instead be performed by the administrative node computer 150. Additionally, the interaction platform 154 and the administrative node computer 150 may be combined as a single entity. In some embodiments, the administrative node computer 150 may be a node that is associated with the interaction platform 154 and that participates in the asset transfer network on behalf of the interaction platform 154 (e.g., similar to how the issuer node computer 165 is associated with the sending institution computer 160).

Embodiments allow the interaction platform 154 and the administrative node computer 150 to exchange functionality and/or be combined because, in some embodiments, both of these entities may be associated with and/or operated by the same managing entity. This managing entity (not shown in the system 100) may be a central entity that administrates the system 100. Accordingly, the interaction platform 154 and the administrative node computer 150 may work together as different components of one network-organizing entity. This managing entity may be associated with and/or operate several other entities in the system 100, such as the interaction platform 154, the foreign exchange transaction application interface 152, the settlement service computer 155, the transaction repository 156, and/or the risk management computer 157.

In some embodiments, the managing entity may also operate the asset transfer network. For example, the managing entity may provide the issuer node computer 165, the administrative node computer 150, and/or the recipient node computer 145. However, in other embodiments, a third party entity may provide the asset transfer network (e.g., the managing entity may outsource control of the asset transfer network). Even in this scenario, the managing entity may still operate one or more nodes (e.g., the administrative node computer 150), or the managing entity may communicate with an administrative node computer 150 that represents the managing entity within the asset transfer network.

In some embodiments, the managing entity may be a transaction processing entity (e.g., one or more transaction processing computers). As an example, a transaction processing computer may include data processing subsystems, networks, and operations used to support and deliver authorization services, exception file services, and clearing and settlement services. For example, the transaction processing computer may comprise a server coupled to a network interface (e.g., by an external communication interface), and databases of information. A transaction processing computer may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. A transaction processing computer may use any suitable wired or wireless network, including the Internet.

The administrative node computer 150 may administrate the asset transfer network. While one administrative node computer 150 is shown in the system 100, there may any suitable number of administrative nodes. In addition to acting as a node in the asset transfer network, the administrative node computer 150 may also organize and ensure the reliability of the asset transfer network. The administrative node computer 150 may be a trusted central entity. As a result, the asset transfer network administered by the administrative node computer 150 may also be trusted. For example, as explained in more detail below, the asset transfer network can be a federated network.

The administrative node computer 150 may provide a number of services to facilitate the asset transfer network and the transaction system. For example, the administrative node computer 150 may enroll nodes, service providers, users, etc. The administrative node computer 150 may also provide enterprise identifiers and key pairs to these enrolled entities. The administrative node computer 150 may also generate digital assets, validate new digital assets, provide digital signatures for new digital assets, and maintain a ledger of transactions.

Figure 2:
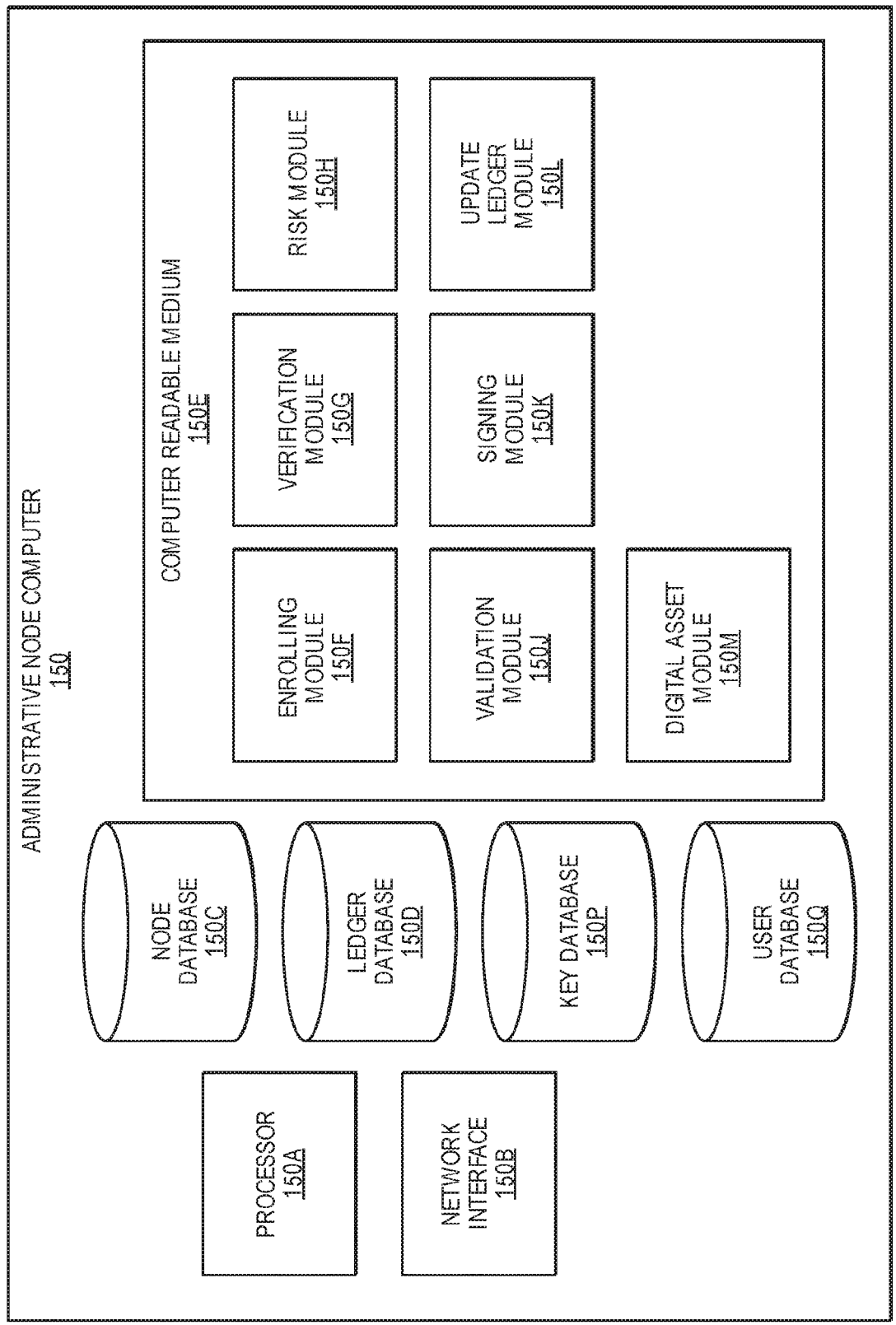
FIG. 2 shows a block diagram of an administrative node computer according to an embodiment of the invention.

An example of an administrative node computer 150, according to some embodiments of the invention, is shown in FIG. 2. The administrative node computer 150 comprises a processor 150A, a network interface 150B, a node database 150C, a ledger database 150D, a key database 150P, a user database 150Q, and a computer readable medium 150E.

The computer readable medium 150E may comprise an enrolling module 150F, a verification module 150G, a risk module 150H, a validation module 150J, a signing module 150K, an update ledger module 150L, a digital asset module 150M, and any other suitable software module. The computer readable medium 150E may also comprise code, executable by the processor 150A for implementing a method comprising receiving, from an issuer node computer, a request to validate a digital asset including a first digital signature, wherein the first digital signature was generated with a first private key associated with the issuer node computer, and wherein the digital asset indicates the transfer of a value from a sender to a recipient; validating the digital asset; generating a second digital signature for the digital asset, the second digital signature generated with a second private key associated with the administrative node computer; providing the second digital signature to the issuer node computer, wherein the issuer node computer sends the digital asset to a recipient node computer; recording the digital asset in a database; and coordinating a transaction associated with the digital asset.

The computer readable medium 150E may further comprise code, executable by the processor 150A for implementing a method comprising processing, by a first data center computer, a first digital asset that indicates the transfer of a value from a sender to a recipient; recording the first digital asset in a first database; and sending message to a second data center computer indicating that the first digital asset was recorded, wherein the second data center computer updates second database based on the message.

The computer readable medium 150E may further comprise code, executable by the processor 150A for implementing a method comprising processing, by a first data center computer, a first data element; creating, by the first data center computer, a first record of the first data element in a first database; and sending, by the first data center computer, a message to a second data center computer indicating that the first record was created, wherein the second data center computer updates a second database based on the message.

The computer readable medium 150E may further comprise code, executable by the processor 150A for implementing a method comprising creating, by the first data center computer, a first block for a first blockchain, the first block including a first block header and first block body; and sending, by the first data center computer, a message to a second data center computer indicating that the first block was created for the first blockchain, the message including the first block header but not the first block body, wherein the second data center computer adds the first block header to a second blockchain, and wherein the second data center computer does not add the first block body to the second blockchain.

As mentioned above, one or more functions, modules, databases, or other aspects of the administrative node computer 150 may instead be embodied at the interaction platform 154.

The enrolling module 150F may comprise code that causes the processor 150A to enroll entities (e.g., financial institutions, users, and businesses) for interacting with the asset transfer network. For example, the enrolling module 150F may contain logic that causes the processor 150A to receive a request from an entity to join the system. The logic may include instructions for evaluating whether or not an entity can enroll, as well as what level of risk to assign to a new entity. For example, the administrative node computer 150 may determine a risk profile for an enrolling financial institution, based on, for example, whether it is a known bank (e.g., based on financial institution name or bank identification number), the risk level of the bank's country, and whether the bank has provided collateral. The administrative node computer 150 may assign a risk level, as well as activity limits based on the risk profile. Activity limits for various types of entities can include, for example, maximum transaction threshold limits and/or velocity limits, such as a limit on the number of digital assets or total digital asset value that can be generated within a certain time period (e.g., a day, a week, or a month).

The enrolling module 150F may include instructions for assigning permissions to enrolled entities. For example, the administrative node computer 150 may allow different nodes, service providers, and users to have different views of a global transaction ledger. In some embodiments, the administrative node computer 150 may allow financial institutions to view transactions to which they were a party.

When users and businesses enroll for participation with the asset transfer network, their information (e.g., a name, an address, a phone number, a business' corporate profile, etc.) may be disclosed to the administrative node computer 150, such that the administrative node computer 150 has sufficient information about participating entities. Further, in some embodiments, the administrative node computer 150 may have access to user information collected by a service provider (e.g., a bank), such as a user's legal name, address (street, city, country, etc.), date of birth, and any other suitable information.

The enrolling module 150F may also include instructions for generating and assigning an enterprise ID for an enrolled entity. Additionally, there may be instructions for generating and distributing keys to enrolled entities. For example, the administrative node computer 150 may generate a key pair for a bank or user when enrolled. In some embodiments, the administrative node computer 150 may provide a digital certificate to an enrolled entity, the digital certificate proving that the entity is certified by the administrative node computer 150, and the digital certificate linking the entity with a public key. In some embodiments, a public key may be used as an enterprise ID.

Information about enrolled users, businesses, and other participants may be maintained in the user database 150Q. In some embodiments, a separate node database 150C may include information about other nodes (e.g., issuer nodes and recipient nodes), as well as entities associated with those nodes.

The verification module 150G may comprise code that causes the processor 150A to verify a digital signature. For example, the verification module 150G may contain logic that causes the processor 150A to apply a public key to a digital signature in order to verify that the signature is authentic. For example, if a signed digital asset is allegedly generated by the issuer node computer 165, a public key associated with the issuer node computer 165 can be used to verify the signature.

The risk module 150H may comprise code that causes the processor 150A to evaluate transaction risk and/or entity risk. For example, the risk module 150H may contain logic that causes the processor 150A to determine the risk for a certain digital asset based on the transaction velocity of one or more parties involved.

The risk module 150H may also include instructions for placing restrictions on entities that are showing risky behavior, or entities involved in settlement failure. For example, if a financial institution is exceeding spending limits, the administrative node computer 150 may temporarily block digital assets generated by the financial institution.

The validation module 150J may comprise code that causes the processor 150A to validate a transaction. For example, the validation module 150J may contain logic that causes the processor 150A to analyze information in a digital asset and determine whether or not to approve the digital asset. For example, the instructions may include determining whether the named recipient (and/or sender) of a digital asset is an enrolled customer that has been screened for compliance. The instructions may also include verifying that financial institutions (or other service providers) are complying with rules and protocols. For example, financial institutions may be required to have know-your-customer compliance (e.g., sufficient information about users), office of foreign assets control compliance, anti-money laundering compliance, etc. Additionally, in some embodiments, a final transaction amount and currency may be confirmed based on the sending amount and currency, the foreign exchange rate, and the transfer fees.

The signing module 150K may comprise code that causes the processor 150A to generate digital signatures. For example, the signing module 150K may contain logic that causes the processor 150A to generate a digital signature for a digital asset using an administrative node private key. The administrative node computer's digital signature can serve to indicate the authenticity of a digital asset, and can provide a guarantee that a transfer is valid and trustworthy. In some embodiments, the administrative node computer's digital signature can be considered a cosigning of the digital asset, or a minting of the digital asset. Further, the digital signature can generate and/or activate a smart contract that holds the sending institution computer 160 liable for the sending amount in the originating currency. For example, a smart contract can automatically initiate a settlement process after a certain amount of time. In some embodiments, the administrative node computer 150 can force settlement between a sending institution account and a recipient institution account at a central bank.

In some embodiments, the administrative node computer 150 may include or be associated with a hardware security module (shown in FIG. 2 as the key database 150P). The hardware security module (HSM) may store one or more keys (e.g., a private key) for the administrative node computer 150, and the hardware security module may sign messages and/or digital assets on behalf of the issuer node computer 165.

The update ledger module 150L may comprise code that causes the processor 150A to maintain a ledger of transactions. For example, the update ledger module 150L may contain logic that causes the processor 150A to record information about a digital asset along with records of previous digital assets. For example, the administrative node computer 150 may record a digital asset once it is minted (e.g., approved and digitally signed), and/or once it is sent to the recipient node computer 145. The ledger may be certified as authentic by the administrative node computer 150, and authenticity can be shown by a digital signature (e.g., for each transaction, or for the entire ledger).

In some embodiments, the update ledger module 150L may include instructions for maintaining a ledger of transactions in the form of a blockchain. For example, the administrative node computer 150 may be able to create and/or sign new blocks. A new block including one or more digital assets may be generated after an average time interval (e.g., every 1 second, 5 seconds, 10 seconds, 30 seconds, 1 minute, ten minutes, 1 hour, etc.). Authenticity may be provided to a block via a digital signature. The administrative node computer 150 may optionally create a hash header for each block based on the digital assets in the body of the block, a hash of a previous block, a block identifier or transaction identifier, a nonce, a random number, and/or any other suitable information.

A ledger, such as a blockchain ledger, may be stored in a ledger database 150D. Additional databases may store transaction records (e.g., a list of transactions not in a blockchain) and/or invoice records. Further, a settlement database may include information about transactions to be settled. In some embodiments, one or more of these databases may instead be embodied by the transaction repository 156.

In embodiments of the invention, the blockchain ledger may not be present on all computers in a distributed network, but may be maintained by a secure administrative node computer 150. Accordingly, computationally intensive features such as proofs of work may not be present or needed. In some embodiments, there may be multiple administrative node computers 150 that each receive transaction updates and update their own ledger. These different administrative node computers 150 may communicate with one another to confirm that their ledgers have the same transaction information.

The update ledger module 150L may further include instructions for providing transaction updates to other nodes. For example, when a new digital asset is validated and signed, the administrative node computer 150 may distribute information about the new digital asset to other nodes (other administrative nodes, issuer nodes, and/or recipient nodes) in the network, such that other nodes can update their own ledgers. The administrative node computer 150 may additionally or alternatively distribute information about ledger updates (e.g., new transaction blocks).

In some embodiments, issuer nodes and recipient nodes may not maintain their own ledger, and may instead refer to the centrally-maintained ledger of the administrative node computer 150. For example, the issuer node computer 165 and the recipient node computer 145 may each be light nodes. In such a case, the administrative node computer 150 may provide other nodes with real-time access to a central ledger, or the administrative node computer 150 may provide regular ledger updates (e.g., updates can be sent every 10 seconds, 1 minute, 5 minutes, etc.). As a result, other nodes may be aware of new digital assets immediately or soon after the digital assets are minted.

The ledger of transactions may provide the administrative node 150 with real-time visibility into the net-position of each financial institution, user, and/or business at any point in time. However, in some embodiments, other entities may not be able to see the entire ledger, and they may instead have a filtered or permissioned view of the ledger. For example, other nodes, financial institutions, and/or users may only be able to view transactions to which they were a party.

This selective disclosure of sensitive information in the global ledger can be accomplished through one or more techniques. For example, the administrative node computer 150 may not provide other nodes (e.g., the issuer node computer 165 and/or the recipient node computer 145) with access to the full ledger. Instead, the administrative node computer 150 may only allow each node to view transactions in the ledger with which they are associated (e.g., based on an enterprise ID, encryption key, transaction ID, etc.). For example, the administrative node computer 150 may send a reduced copy of the ledger to each node, or may block parts of the ledger when a central ledger is being accessed by a node. In some embodiments, information about some recorded transactions can be obscured (e.g., encrypted) in the body of the block or removed from the block, but all block headers may still be provided. As a result, the entire blockchain (which may be linked by hashed headers) can still be shown as complete, but transaction details within blocks can be removed or obscured.

In some embodiments, one-time-use addresses (e.g., one-time-use enterprise IDs, or other one-time-use identifiers) can be used for payees and/or payors. As a result, the user and/or resource provider may not be personally identifiable based on an address or other information in a digital asset. Thus, even if a transaction (and the transaction details) is publicly viewable, the user may not be identified based on information in the transaction. Instead, the user's identity and account number can remain anonymous. However, the user and resource can maintain information about one-time-use addresses and identifiers which they have used, and thereby be able to identify transactions in the ledger to which they were party.

In some embodiments, a filtered ledger view can also be achieved through encrypting metadata in digital assets. For example, information identifying the user and/or resource provider in a digital asset can be encrypted with public keys associated with the user and/or resource provider. As a result, only the user and/or resource provider may be able view decrypt and view identification (or other) information in digital assets included in a ledger to which they were party.

In some embodiments, zero-knowledge proofs can be used to verify the authenticity of a filtered transaction ledger. When the digital asset value and/or identification information in a transaction is cryptographically concealed, a zero-knowledge proof can be used to validate the integrity of the contents. For example, an outside party can use a zero-knowledge proof to verify that a digital asset's claimed value is authentic (and not fraudulent), or to verify that a blockchain ledger is authentic, but the outside party may not be able to identify the exact history of the value or the parties involved. As a result, only the parties involved (and those granted access) can view the details of the transaction. Embodiments may not require normal proof of work, as the ledger may be trusted without such verification (e.g., due to the federated nature of the network).

The update ledger module 150L may further include instructions for communicating information about new digital assets to end users (e.g., the user computer 110 and/or the resource provider computer 130). For example, the administrative node computer 150 may send a message to the user computer and/or the resource provider computer 130 when a digital asset is created, signed, and/or distributed. As a result, the end users can be aware of new transfers when they initially take place. In some embodiments, messages can instead be sent to service providers (e.g., the sending institution computer 160 and/or the recipient institution computer 140), which may in turn inform the end users.

As mentioned above, in some embodiments, the administrative node computer 150 (or the interaction platform 154) may perform one or more functions instead of the issuer node computer 165. For example, instead of the issuer node computer 165, the administrative node computer 150 may generate digital assets on behalf of the sending institution computer 160. For this reason, the administrative node computer 150 may include a digital asset module 150M. The digital asset module 150M may comprise code that causes the processor 150A to create digital assets. For example, the digital asset module 150M may contain logic that causes the processor 150A to generate a digital asset including information associated with transferring a value from a user account to a recipient account.

Additionally, in some embodiments, the administrative node computer 150 may generate a digital signature on behalf of the sending institution computer 160 and/or issuer node computer 165. For example, the administrative node computer 150 may store keys associated with the sending institution computer 160 and/or issuer node computer 165, and may create a digital signature for a digital asset after the digital asset is generated.

Referring back to FIG. 1, the issuer node computer 165 may be a node in the asset transfer network, and the issuer node computer 165 may be associated with the sending institution computer 160. The issuer node computer 165 may be able to generate, mint (or request minting), and/or provide digital assets in order to transfer value (e.g., funds) on behalf of the sending institution computer 160. In some embodiments, the issuer node computer 165 may receive a payment instruction from the sending institution computer 160 via the interaction platform 154.

In some embodiments, the issuer node computer 165 may exclusively provide services for one financial institution. In other embodiments, the issuer node computer 165 may represent two or more financial institutions (e.g., multiple banks).

In some embodiments, the issuer node computer 165 may be centrally-enrolled (e.g., by the administrative node computer 150 or a third party enrolling service provider) in order to participate in the asset transfer network. Once enrolled, the issuer node computer 165 may be associated with an enterprise ID.

Figure 3:
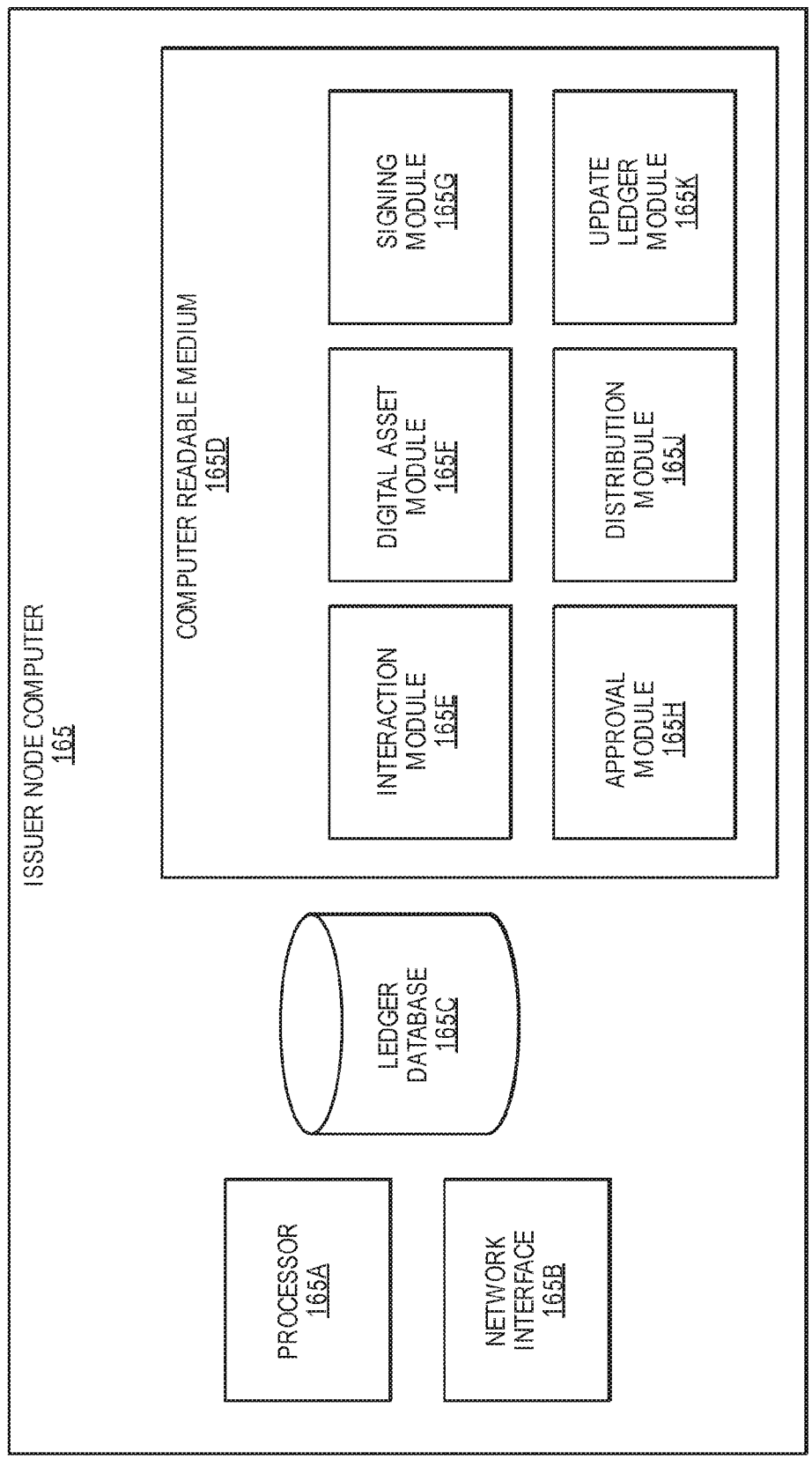
FIG. 3 shows a block diagram of an issuer node computer according to an embodiment of the invention.

An example of an issuer node computer 165, according to some embodiments of the invention, is shown in FIG. 3. The issuer node computer 165 comprises a processor 165A, a network interface 165B, a ledger database 165C, and a computer readable medium 165D.

The computer readable medium 165D may comprise an interaction module 165E, a digital asset module 165F, a signing module 165G, an approval module 165H, a distribution module 165J, an update ledger module 165K, and any other suitable software module. The computer readable medium 165F may also comprise code, executable by the processor 165A for implementing a method comprising receiving a request to transfer a value from a sender associated with a sender identifier to a recipient associated with a recipient identifier; generating a digital asset indicating that the value is being transferred to the recipient; generating a first digital signature for the digital asset, the first digital signature generated with a first private key associated with the issuer node computer; sending, to an administrative node computer, a request to validate the digital asset, the request including the digital asset and the first digital signature, wherein the administrative node computer validates the digital asset and generates a second digital signature for the digital asset, the second digital signature generated with a second private key associated with the administrative node computer; receiving the second digital signature from the administrative node computer; and providing the digital asset to a recipient node computer associated with the recipient, wherein the administrative node computer records the digital asset in a database and coordinates a transaction associated with the digital asset.

The interaction module 165E may comprise code that causes the processor 165A to interact with other entities, such as the sending institution computer 160 and the interaction platform 154. For example, the interaction module 165E may contain logic that causes the processor 165A to receive a payment instruction from the sending institution computer 160 (e.g., via the interaction platform 154).

The digital asset module 165F may comprise code that causes the processor 165A to create digital assets. For example, the digital asset module 165F may contain logic that causes the processor 165A to generate a digital asset including information for transferring a value from a user account to a recipient account.

The signing module 165G may comprise code that causes the processor 165A to create a digital signature. For example, the signing module 165G may contain logic that causes the processor 165A to apply a private key and/or a mathematical algorithm to a digital asset, such that the digital signature is generated for the digital asset. Other entities (e.g., other nodes) may then be able to use a corresponding public key to verify the digital signature, and thereby verify the authenticity of the digital asset.

In some embodiments, the issuer node computer 165 may include or be associated with a hardware security module. The hardware security module (HSM) may store one or more keys (e.g., a private key) for the issuer node computer 165, and the hardware security module may sign messages and/or digital assets on behalf of the issuer node computer 165.

In some embodiments, the issuer node computer's key pair may be generated and provided by the administrative node computer 150 (e.g., via a digital certificate), or by a separate third party service computer. In other embodiments, the issuer node computer's key pair may be generated locally (e.g., by a hardware security module). When a key pair is generated locally, the issuer node computer 165 may provide the key pair to the administrative node computer 150 during enrolling.

The approval module 165H may comprise code that causes the processor 165A to obtain approval for a digital asset. For example, the approval module 165H may contain logic that causes the processor 165A to provide a digital asset and/or a corresponding issuer node digital signature to the administrative node computer 150 in order obtain approval and a second digital signature from the administrative node computer 150. The administrative node computer 150 may then verify the issuer node computer's digital signature, validate the digital asset, and generate a second digital signature for the digital asset.

The distribution module 165J may comprise code that causes the processor 165A to distribute digital assets. For example, the distribution module 165J may contain logic that causes the processor 165A to provide a digital asset to a recipient node computer 145, an administrative node computer 150, and/or any other suitable node or other entity. In order to provide a digital asset to the appropriate recipient node computer 145, the issuer node computer 165 may operate suitable routing tables. For example, the recipient node computer 145 may be identified based on an enterprise identifier, public key, bank identification number, and/or any other suitable identifier in the digital asset.

The update ledger module 165K may comprise code that causes the processor 165A to record information related to the creation and/or distribution of a digital asset for a transaction. For example, the update ledger module 165K may contain logic that causes the processor 165A to record information by updating a ledger of transactions based on a new digital asset or other transaction. Such a ledger may be stored at the ledger database 165C. The update ledger module 165K may include instructions for adding a block to a blockchain, the new block including information about one or more transactions.

In some embodiments, the issuer node computer 165 may view a ledger kept by the administrative node computer 150 or by a third-party ledger manager, instead of maintaining its own ledger.

In some embodiments, the issuer node computer 165 may only be able to view a subset of transactions that take place within the asset transfer network. For example, the issuer node computer 165 may have a filtered view of a full ledger (e.g., a blockchain) maintained by the administrative node computer 150. The issuer node computer 165 may be able to view transaction records for transactions to which the issuer node computer 165 or the sending institution computer 160 was party. In some embodiments the issuer node computer 165 may be able to view block headers for every block in the total blockchain, but the issuer node computer 165 may not be able to view some or all of the record information within the block bodies (e.g., transactions with which the issuer node computer 165 is not associated, or transactions that took place in a different country).

This filtered ledger view may be achieved through several possible implementations. For example, the issuer node computer 165 may be a light node, only receiving information about relevant transactions. In one implementation, the issuer node computer 165 only receives all block headers, but only receives corresponding block bodies for transactions with which it is associated. If the issuer node computer 165 builds its own copy of the transaction ledger, it may only receive block headers for some blocks. If the issuer node computer 165 does not build its own ledger, and instead accesses a central ledger (e.g., kept by the administrative node computer 150), the central ledger may be filtered when the issuer node computer 165 is accessing it, such that the issuer node computer 165 can only see block headers for certain blocks.

In some embodiments, the issuer node computer 165 may obscure or remove parts of the ledger when showing it to the sending institution computer 160. For example, the issuer node computer 165 may have access to the entire ledger, but it may remove block bodies for some blocks (while still optionally displaying block headers) when the sending institution computer 160 views the ledger.

Additional techniques for providing the filtered ledger view are described above. For example, digital assets may include less information about the providing entities (e.g., the user, sending bank, and/or sending node), such that recipients can receive the value from the digital asset without personal sender information being exposed.

In some embodiments, one or more of the above-described issuer node computer 165 functions may instead be performed by another entity, such as the administrative node computer 150 or interaction platform 154. For example, instead of the issuer node computer 165, the interaction platform 154 may generate a digital asset on behalf of the sending institution computer 160 (e.g., the interaction platform 154 may do this instead of forwarding a transaction instruction to the issuer node computer 165). Similarly, in some embodiments, another entity may manage keys and provide digital signatures on behalf of the issuer node computer 165. For example, the administrative node computer 150 or interaction platform 154 can store the issuer node computer's keys in an HSM, and can generate digital signatures for digital assets on behalf of the issuer node computer 165.

Referring back to FIG. 1, the recipient node computer 145 may be a node in the asset transfer network. The recipient node computer 145 may be associated with or operated by the recipient institution computer 140. For example, the recipient node computer 145 may be able to receive digital assets on behalf of the recipient institution computer 140, may store digital assets on behalf of the recipient institution computer 140, and may transfer the received digital assets to the recipient institution computer 140 (e.g., via the interaction platform 154).

In some embodiments, the recipient node computer 145 may exclusively provide services for one financial institution. In other embodiments, the recipient node computer 145 may represent two or more financial institutions (e.g., multiple banks).

The recipient node computer 145 may be centrally-enrolled (e.g., by the administrative node computer 150) in order to participate in the asset transfer network. Once enrolled, the recipient node computer 145 may be associated with an enterprise ID.

The recipient node computer 145 may be able to receive a digital asset sent by the issuer node computer 165 and/or the administrative node computer 150. In some embodiments, digital assets may be broadcasted to several or all nodes, and the recipient node computer 145 may identify which digital assets are relevant to the recipient institution and/or resource provider (e.g., based on a recipient enterprise ID indicated in the digital asset).

The recipient node computer 145 may also validate that a digital asset is authentic. For example, the recipient node computer 145 may verify one or more digital signatures associated with a digital asset. The digital signatures may be verified with public keys associated with the signing entities (e.g., the sending institution computer 160, the issuer node computer 165, and/or the administrative node computer 150).

In some embodiments, the recipient node computer 145 may also record information about digital assets received for a transaction. For example, the recipient node computer 145 may update a ledger of transactions based on a new digital asset or other transaction. In some embodiments, the recipient node computer 145 may add a block to a blockchain, the new block including information about one or more digital assets. In other embodiments, the recipient node computer 145 may view a ledger kept by the administrative node computer 150, instead of maintaining its own ledger.

In some embodiments, the recipient node computer 145 may only be able to view a subset of transactions that take place within the asset transfer network. For example, the recipient node computer 145 may have a filtered view of a full ledger (e.g., a blockchain) maintained by the administrative node computer 150. The recipient node computer 145 may be able to view transaction records for transactions to which the recipient node computer 145 or the recipient institution computer 140 was party. For example, the recipient node computer 145 may be a light node, only receiving information about relevant transactions. In some embodiments the recipient node computer 145 may be able to view block headers for every block in the total blockchain, but the recipient node computer 145 may not be able to view some or all of the record information within the block bodies. For example, block bodies may be removed that include transactions with which the recipient node computer 145 is not associated, or transactions that took place in a different country.

In some embodiments, if the recipient node computer 145 builds its own copy of the transaction ledger, the administrative node computer 150 may only send block headers for some blocks when the administrative node computer 150 provides ledger updates to the recipient node computer 145. Alternatively, if the recipient node computer 145 does not build its own ledger, and instead accesses a central ledger (e.g., kept by the administrative node computer 150), the central ledger may be filtered when it is accessed by the recipient node computer 145, such that the recipient node computer 145 can only see block headers for certain blocks (e.g., blocks including digital assets with which the recipient node computer 145 is associated).

In some embodiments, the recipient node computer 145 may remove ledger information when the recipient institution computer 140 is viewing the ledger. For example, the recipient node computer 145 may obscure or reduce the ledger (e.g., by encrypting or removing some transaction details and/or block bodies for some transactions, but still showing the block headers), such that the recipient institution computer's view of the ledger is filtered.

The issuer node computer 165 and recipient node computer 145 may provide different services (e.g., providing and receiving digital assets) for a financial institution that utilizes the asset transfer network. Accordingly, each financial institution (e.g., the sending institution computer 160 and the recipient institution computer 140) may use the services of both an issuer node computer 165 and a recipient node computer 145. In some embodiments, a single node may act as both an issuer node and a recipient node.

The recipient institution computer 140 may store value and receive value (e.g., receive a payment) on behalf of the resource provider computer 130. An example of a recipient institution may be an acquirer, which may typically be a business entity (e.g., a commercial bank) that has a business relationship with a particular resource provider or other entity. Some entities can perform both issuer and acquirer functions. Some embodiments may encompass such single entity issuer-acquirers.

In some embodiments, the recipient institution computer 140 may make a value indicated in a received digital asset immediately usable (e.g., withdrawable) in a resource provider account. The recipient institution computer 140 may settle the transaction by receiving the actual value from the sending institution computer 160 (instead of just an IOU) at a later time.

The recipient institution computer 140 may enroll for interaction with the asset transfer network (e.g., via the interaction platform 154 or the administrative node computer 150) in order to participate in the system 100. As a result, the recipient institution computer 140 may receive and be associated with a unique enterprise ID. In some embodiments, the recipient institution computer 140 may also receive and be associated with a key pair. Such a key pair may be stored in an HSM.

The resource provider computer 130 may be associated with a resource provider, which may be an entity that can provide a resource such as goods, services, information, and/or access. Examples of a resource provider include merchants, access devices, secure data access points, etc. A merchant may typically be an entity that engages in transactions and can sell goods or services, or provide access to goods or services.

The resource provider may have an account at the recipient institution computer 140. The account may be associated with various resource provider information. For example, a resource provider account may be associated with a merchant name, a residential and/or business address, a phone number, an account username, an account password, an email address, etc.

The resource provider computer 130 may be enrolled for asset transfer network services. For example, the resource provider may enroll via the interaction platform 154, or the recipient institution computer 140 may enroll on behalf of the resource provider. Accordingly, the resource provider computer 130 may also be associated with a unique enterprise ID.

In some embodiments, the resource provider computer 130 can have relationships with multiple institutions (e.g., both a recipient institution and a sending institution). The resource provider computer 130 can register with the asset transfer network through each entity, and can thereby become associated with multiple enterprise IDs. For example, a first enterprise ID can represent the resource provider computer 130 when interacting through a recipient institution, and a second enterprise ID can represent the resource provider computer 130 when interacting with the network through a sending institution. In some embodiments, different enterprise IDs can be assigned to the resource provider computer 130 for transacting (e.g., creating digital assets) in different types of currency (e.g., a first enterprise ID for US dollars, and a second enterprise ID for British pounds). Embodiments allow the user and any other suitable entity to obtain multiple enterprise IDs in a similar manner.

The foreign exchange transaction application interface 152 may provide information about foreign exchange rates. For example, before initiating an international transaction, the user computer 110 and/or sending institution computer 160 may be able to view real-time foreign exchange rates for the transaction. In some embodiments, the foreign exchange transaction application interface 152 may be provided by the interaction platform 154, the administrative node computer 150, or otherwise by a managing entity (e.g., a payment processing entity).

The settlement service computer 155 (which may include one or more server computers) may be able to provide settlement services. For example, a digital asset may act as a guarantee of payment or an IOU (e.g., a certificate of intended payment), but the actual transfer of funds may not actually take place when a digital asset is provided. Accordingly, after the digital asset is sent, the settlement service computer 155 may be able to facilitate the actual exchange of funds between the sending institution computer 160 and the recipient institution computer 140 (e.g., by transferring value between respective settlement accounts at a central settlement bank). The settlement service computer 155 may facilitate settlement by interacting with a central settlement account service (e.g., a central bank) that may be associated with the asset transfer network. For example, a central bank may be associated with the administrative node computer 150, the interaction platform 154, or a managing entity. In some embodiments, the settlement service computer 155 itself may be operated by the interaction platform 154 or otherwise by a managing entity (e.g., a payment processing entity).

The transaction repository 156 (which may include one or more server computers) may be a database for past transactions. For example, a ledger of transactions may be stored at the transaction repository 156. The administrative node computer 150 may store its ledger (e.g., a blockchain ledger) or a non-blockchain record of transactions at the transaction repository 156.

The risk management computer 157 (which may include one or more server computers) may provide risk management services. For example, the risk management computer 157 may analyze the risk associated with digital assets being sent in the asset transfer network. In some embodiments, the functions described with respect to the risk module 150H at the administrative node computer 150 may instead be performed by the risk management computer 157.

In some embodiments, the system 100 may include one or more asset auditor nodes (not shown), which may be able to audit the network. For example, an asset auditor node may confirm that different ledgers match, that nodes and financial institutions are acting within the rules and limits, and that no double spending is taking place. Asset auditor nodes may be operated by the same managing entity as the interaction platform 154 and/or the administrative node computer 150.

As mentioned above, the system 100 can be used for any type of value transfer, such as the transfer of access credentials, digital media, or any other suitable value. Accordingly, service providers that are not financial institutions may also be able to participate in the system 100. For example, other service providers may be able to manage user accounts, operate issuer nodes and recipient nodes, etc.

Figure 4:
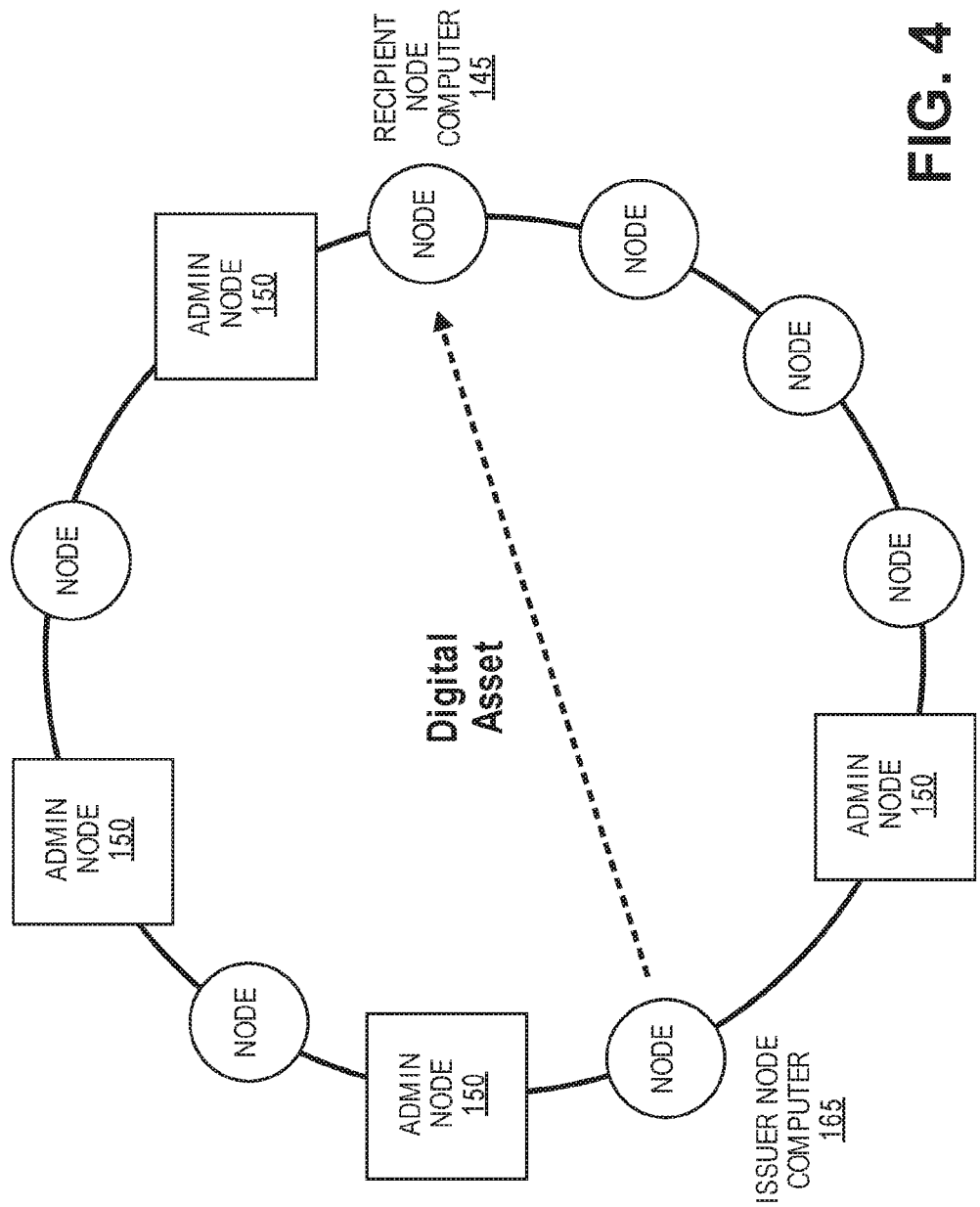
FIG. 4 shows an example of an asset transfer network, according to an embodiment of the invention.

An example of an asset transfer network is shown in FIG. 4. In some embodiments, as shown in FIG. 4, several nodes may be able to provide and receive digital assets within the asset transfer network. An example transfer is shown, where an issuer node computer 165 is providing a digital asset to a recipient node computer 145. While a direct arrow is shown, the issuer node computer 165 may actually broadcast the digital asset information to several or all of the nodes in the network. One or more administrative nodes may maintain a ledger of digital assets that have been transferred between nodes.

In some embodiments, the asset transfer network may be a blockchain network. For example, the ledger can take the form of a blockchain. Each block in the blockchain may include information about one or more transactions (e.g., digital assets). A blockchain ledger may be unalterable without detection. For example, each block may include a data header that includes a hash of the previous block in the blockchain ledger and a root value of all past transactions. Since each block in the blockchain ledger may be generated in a similar manner by including a data header storing information referencing its previous entry and previous transactions, no entry can be modified without affecting all following entries. This ensures that any tampering of information related to transactions, such as an attempt to reassign a digital asset to an inappropriate entity, will not go unnoticed. Together, a block header and a block body that includes the transaction information (e.g., and any other suitable information) can make up a block.

As mentioned above, a blockchain can be a distributed database that maintains a continuously-growing list of digital records secured from tampering and revision. A blockchain may include a number of blocks of interaction records. Each block in the blockchain can contain also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a verification network. Any node within the verification network may subsequently use the blockchain to verify transactions. The security of a blockchain may be obtained using a cryptographic scheme.

In some embodiments, the asset transfer network may be a federated asset transfer network (also known as a "permissioned" asset transfer network). For example, permission may be required from a trusted central party in order to participate in the asset transfer network. As explained above, the administrative node computer 150 may be able to enroll entities into the network. Accordingly, the administrative node computer 150 may be able to decide which parties can participate, as well as set rules and protocols for participating in the network. The administrative node computer 150 may also be able to restrict an entity if desired (e.g., limit or block a financial institution due to misbehavior).

Entities that can validate the network (e.g., enroll entities for participating, and enforce compliance) may be referred to as "federated" entities. In some embodiments, the administrative node computer 150 may be the only federated entity. In other embodiments, another entity may perform this administrating role instead of the administrative node computer 150. For example, a managing entity (which may be associated with the administrative node computer 150), or a separate third party service provider, may administrate asset transfer network.

In some embodiments, the asset transfer network may function as a private asset transfer network. For example, the asset transfer network may serve as a tool for a transaction processor to record transactions. The network ledger may essentially be an outsourced record-keeping system, and may only be accessed and/or modified by the transaction processor.

Figure 5:
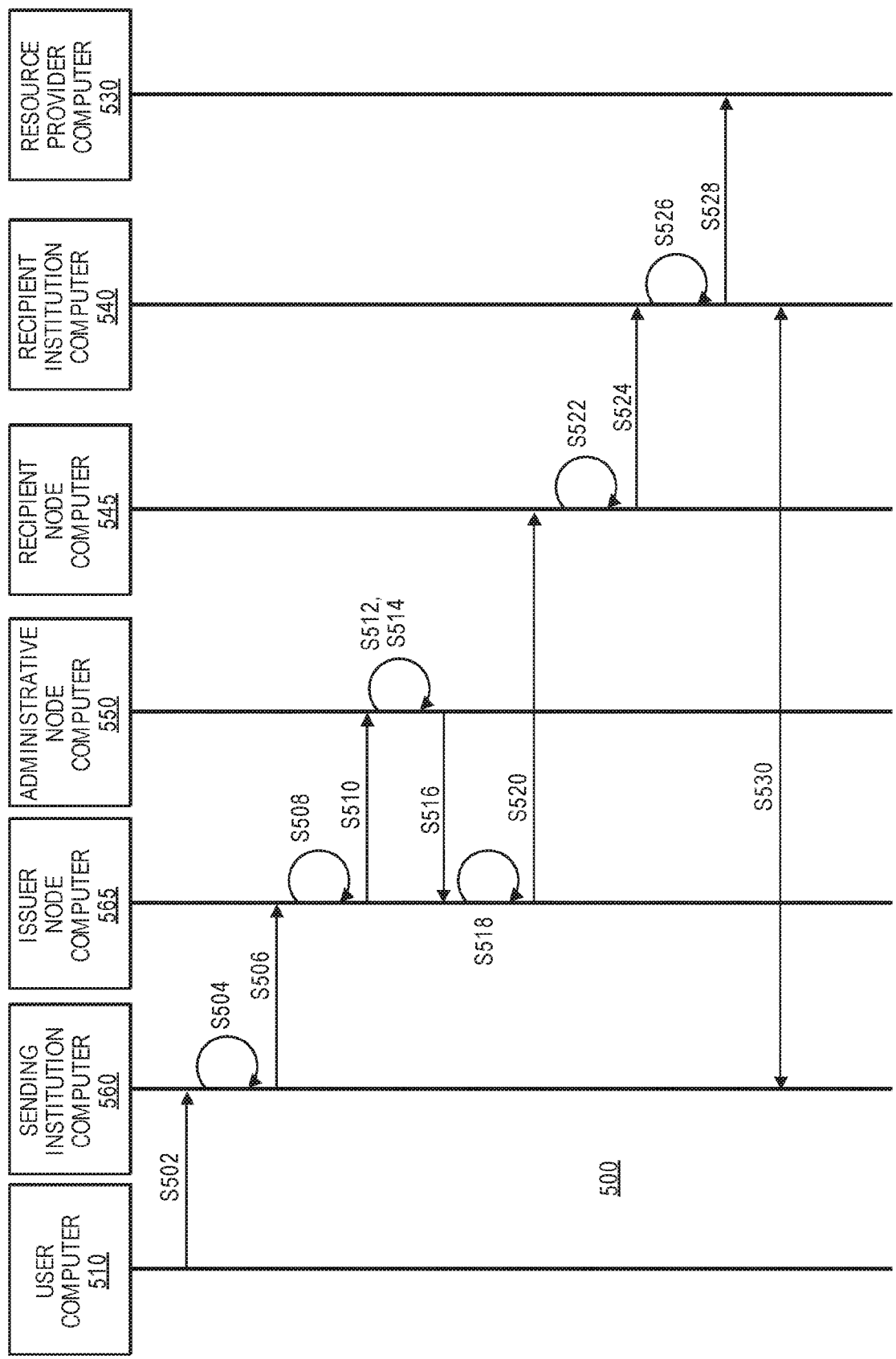
FIG. 5 shows a flow diagram illustrating a method for providing a digital asset in an asset transfer network, according to embodiments of the invention.

A method 500 according to embodiments of the invention can be described with respect to FIG. 5. Some elements in other Figures are also referred to. The steps shown in the method 500 may be performed sequentially or in any suitable order in embodiments of the invention. In some embodiments, one or more of the steps may be optional.

The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

As described above, a number of entities may be enrolled for interaction with an asset transfer network (which may be a blockchain network). Each entity (e.g., nodes, financial institutions, and users) may be associated with and identifiable based on a unique enterprise ID. In the following example, the network is used for transferring currency. However, transfer of any other suitable type of value (e.g., usage credit, access credentials, ownership credentials, digital media, etc.) can also take place.

The user computer 510 may initiate providing a value to the resource provider computer 530. For example, the resource provider may provide goods or services to the user, and the resource provider computer 530 may send a payment invoice to the user computer 510. The invoice may include an amount, a currency type, an enterprise ID associated with the resource provider computer 530 or a resource provider account, information about goods or services provided, an invoice identifier, and any other suitable information.

At step S502, the user (e.g., via the user computer 510) may contact the sending institution computer 560 and request that a payment is sent to the resource provider computer 530. The user computer 510 may provide any suitable information about the payment, such as an amount and a recipient currency type, information identifying the recipient (e.g., the resource provider's enterprise ID), an invoice, and a selection of a user account from which to draw funds for the payment.

The payment may be an international transfer. For illustrative purposes only, the user account may be an account based in the United States including US Dollars. The recipient (e.g., resource provider) account may be an account based in England including British Pounds.

At step S504, the sending institution computer 560 may gather information for initiating the payment. For example, for an international transaction, a foreign exchange rate may be needed in order to identify the correct amount of currency to withdraw from the user's account. The sending institution computer 560 may obtain information about a current foreign exchange rate that is relevant for the transaction (e.g., exchange rate for US Dollars to British Pounds) from the foreign exchange transaction application interface (e.g., via the interaction platform).

The foreign exchange transaction application interface or interaction platform may also provide information about transfer fees that may be charged for the transaction. For example, there may be fees charged by the sending institution computer 560, the recipient institution computer 540, and/or any of the participating nodes for administrating the transaction. In some embodiments, all of these fees may be immediately calculated and available before the transaction is initiated. The sending institution computer 560 may also provide this fee and foreign exchange information to the user computer 510.

Accordingly, the sending institution computer 560 may be able to determine the amount of funds that will be drawn from the user's account (i.e., how much to charge the user). The total charge can be calculated based on the amount the resource provider should receive, the transfer fees, and the exchange rate.

For example, the user may wish to provide £1000 to the resource provider. The foreign exchange rate may be 1 British Pound to 1.33 US Dollars. Accordingly, $1330 may be needed to provide £1000. Additionally, the sending institution computer 560 may charge $15 for the transfer. Accordingly, it may be determined that the user will be charged $1345 in order to provide £1000.

In other embodiments, the sending institution computer 560 may instead start with the user's indicated amount to send in the originating currency, and may deduct the fees and exchange rate in order to determine the amount that the resource provider will receive.

The sending institution computer 560 may also check that the transaction will conform to rules and limits placed on the user and/or sending institution computer 560, as well as perform any suitable risk analysis. For example, the sending institution computer 560 may verify that the transaction will not exceed velocity or amount thresholds for the user account or the sending institution computer 560. The sending institution computer 560 can also verify that the user's account has sufficient funds for the transaction.

At step S506, the sending institution computer 560 may send a transaction request to the issuer node computer 565 (e.g., via the interaction platform). The request may include information for providing a payment to the resource provider, such as information about the originating currency, the destination currency, the amount, the fees and exchange rate, a resource provider enterprise ID, a user enterprise ID, and sending institution computer 560 enterprise ID, and any other suitable information.

The sending institution computer 560 may also debit or place a hold on the user's account for the total charge amount. Thus, the funds may still be available for settlement at a later time.

At step S508, the issuer node computer 565 may generate a digital asset for the requested transaction. The digital asset may include any suitable information (e.g., remittance information) for communicating that a value is being transferred from the user account to a resource provider account. For example, the digital asset can include a digital asset identifier, the originating currency type, the destination currency type, the sending currency amount, the fees and exchange rate, the destination currency amount, various user information (e.g., user enterprise ID, address, phone number, email address), various sending institution computer 560 information (e.g., financial institution name, enterprise ID, public key, BIN), various resource provider computer 530 information (e.g., enterprise ID, name, address, phone number, email address), various recipient institution computer 540 information (e.g., financial institution name, enterprise ID, public key, BIN), an issuer node computer 565 enterprise ID and/or public key, a recipient node computer 545 enterprise ID and/or public key, an invoice number and invoice information, a purchase order number, a timestamp, and any other suitable information. The digital asset identifier may be an identifier generated by issuer node computer 565 that uniquely identifies the digital asset. For example, the digital asset identifier may be a string of alphanumeric characters or a scannable image (e.g., QR code). A transaction identifier may be used as a digital asset identifier.

The issuer node computer 565 may also generate a digital signature for the digital asset, the digital signature demonstrating that the digital asset was truly created by the issuer node computer 565. The digital signature may be generated by applying a mathematical algorithm to the digital asset and the issuer node computer's private key (or the sending institution computer's private key). The digital signature may be attached to or included in the digital asset, as may the issuer node computer's corresponding public key for verifying the digital signature.

The digital asset may be considered a guarantee for the payment amount. Thus, once it is signed and sent, various entities can count the payment as either completed or soon to be completed. For example, the digital asset may be valued similarly to a paper check, and may include any necessary information for obtaining the promised funds.

Before generating and/or providing the digital asset, the issuer node computer 565 may also check that the digital asset transaction conforms to rules, protocols, and limits (e.g., velocity and transaction amount thresholds).

At step S510, the issuer node computer 565 may provide the digital asset and any other suitable information to an administrative node computer 550. The issuer node computer 565 may request approval of the digital asset, as well as request a second digital signature. For example, the issuer node computer 565 can transmit a message that is recognizable by the administrative node computer 550 as a digital asset transfer request message. The message can include the digital asset and the first digital signature, and can request that the administrative node computer 550 approve of (e.g., validate) the digital asset, provide a second digital signature, post the digital asset to a blockchain ledger, inform the recipient node computer 545 about the digital asset, and/or otherwise process the digital asset.

At step S512, the administrative node computer 550 may validate the digital asset. For example, the administrative node computer 550 may identify each involved entity based on the enterprise IDs, and may ensure that each entity is enrolled and in good standing. For example, the administrative node computer 550 may check whether each entity is following rules and protocols, and within any risk limits. The administrative node computer 550 may also perform risk analysis on the transaction, checking for any warning flags (e.g., an unusually high amount, or an unusual direction of transfer for a given account or financial institution).

The administrative node computer 550 may also verify the issuer node computer's digital signature (e.g., with the issuer node computer's public key or the sending institution computer's public key). The administrative node computer 550 may also check that the attached public key is truly associated with the issuer node computer's enterprise ID, and similarly make sure that other information in the digital asset is accurate and valid.

At step S514, after validating the transaction, administrative node computer 550 may generate a second digital signature for the digital asset. For example, the administrative node computer 550 may use a private key to generate a digital signature based on information in the digital asset. In some embodiments, the digital asset may be considered minted and valid after the second digital signature is provided.

In some embodiments, the administrative node computer 550 may also generate a smart contract for the digital asset (e.g., a smart contract indicating under what conditions the digital asset value should be settled). For example, each entity participating in the network may have, during registration, agreed to having smart contracts established when a digital asset is requested or generated. Thus, the administrative node computer 550 may have permission to create and enforce smart contracts. When a smart contract settlement condition is triggered, the administrative node computer 550 can force settlement between a sending institution account and a recipient institution account (e.g., accounts at a central bank, or other correspondent accounts).

At step S516, the administrative node computer 550 may provide the digital asset and second digital signature back to the issuer node computer 565. The issuer node computer 565 may thus be informed that the digital asset is validated and ready for use.

At this point, or at a later time, the administrative node computer 550 may also update a ledger of transactions based on the digital asset. An entry in the ledger may include information about the value, the recipient of the value, the sender of the value, the transaction date and time, the digital asset identifier, and any other suitable information. In some embodiments, the ledger may include a copy of the digital asset.

In some embodiments, the administrative node computer 550 may also distribute information about the digital asset or updated ledger to other administrative node computers 550. Also, when the ledger is updated, the transaction (e.g., transfer of value from the user to the resource provider) may be considered official and guaranteed.

In some embodiments, the administrative node computer 550 may update a ledger by adding a new block to a blockchain, the new block including information about the new digital asset. The new block may also include information about other transactions that took place during a similar time period (e.g., all digital assets minted within a ten minute interval).

In some embodiments, the ledger may not be updated (e.g., a block may not be added) until the transactions are validated throughout the asset transfer network. The nodes in the network may use Simplified Byzantine Fault Tolerance (SBFT), or any other suitable method, to reach consensus on how blocks are added to the blockchain at each step. In SBFT, one designated block generator (e.g., an administrative node computer 550) collects and validates proposed transactions, periodically batching them together into a new-block proposal. Other designated block signers (e.g., administrative node computers 550) ratify the proposed block with their signatures. All network members may know the identities of the block signers and accept blocks only if signed by a sufficient number of signers. This ensures that competing transactions can be resolved, transactions can be final, and history cannot be rewritten.

At step S518, having received the second digital signature for the digital asset, the issuer node computer 565 may update a ledger of transactions to include the new digital asset. Alternatively, in some embodiments, the issuer node computer 565 may not maintain its own ledger, and may instead refer to the administrative node computer's ledger when needed.

At step S520, the digital asset may be generated, minted (e.g., signed), recorded, and ready to send. Accordingly, in some embodiments, the issuer node computer 565 may provide the digital asset to the recipient node computer 545. The issuer node computer 565 may identify the correct recipient node computer 545 for providing the digital asset based on one or more enterprise IDs present in the digital asset (e.g., an enterprise ID of the recipient node computer 545, the recipient institution computer 540, or the resource provider computer 530). Embodiments allow several alternative methods of providing the digital asset to the recipient node computer 545, which are described below after this flow description.

At step S522, the recipient node computer 545 may receive and verify the authenticity of the digital asset. For example, the recipient node computer 545 may verify that one or more digital signatures are authentic and associated with the sending institution computer 560, the issuer node computer 565 and/or the administrative node computer 550.

In some embodiments, the digital asset may include public keys associated with the sending institution computer 560, the issuer node computer 565 and/or the administrative node computer 550. Alternatively, the digital asset may include enterprise IDs associated with one or more of these entities, and the recipient node computer 545 may lookup appropriate public keys based on the enterprise IDs. The recipient node computer 545 may then use the public keys included to verify the one or more digital signatures.

In some embodiments, verifying the digital signatures can be considered verification that the digital asset information is valid, and that the digital asset value is legitimately being transferred. In some embodiments, the recipient node computer 545 may also confirm that the value being transferred is properly owned by the user (e.g., if the recipient node computer 545 has a full ledger view or other access to user account records).

In some embodiments, the recipient node computer 545 may also update a ledger. Alternatively, in some embodiments, the recipient node computer 545 may not maintain its own ledger, and may instead refer to the administrative node computer's ledger when needed.

At step S524, the recipient node computer 545 may forward the digital asset to the recipient institution computer 540 (e.g., via the interaction platform). The recipient node computer 545 may provide all digital assets to the same recipient institution computer 540, or may provide the digital asset to a recipient institution computer 540 associated with an enterprise ID indicated in the digital asset. Additionally, the recipient node computer 545 may provide a message to the resource provider computer 530 with information about the received digital asset and promised value.

At step S526, the recipient institution computer 540 may store the digital asset and associate it with the resource provider's account. The recipient institution computer 540 may identify the resource provider computer 530 and/or the resource provider account based on a recipient enterprise ID indicated in the digital asset.

In some embodiments, the recipient institution computer 540 may have a high level of trust that the digital asset authentic and that the value will be provided. For example, the recipient institution computer 540 may trust the digital signatures provided with the digital asset, the recipient institution computer 540 may trust the administrative node computer 550, and the recipient institution computer 540 may trust other participating network entities because they all have been screened when enrolled. It may be unlikely that a fraudster submitted the digital asset instead of the issuer node computer 565, as the issuer node computer's private key may be kept secure. Also, even if the transfer was fraudulently initiated, the administrative node computer 550 may still guarantee the funds. Further, a smart contract that can force the funds transfer may have been established, thereby providing further assurance to the recipient institution computer 540 that the value indicated in the digital asset will be received.

Accordingly, in some embodiments, the recipient institution computer 540 may immediately credit the resource provider's account with a value indicated in the digital asset. As a result, the value may be available for use (e.g., withdrawal) immediately upon receipt of the digital asset, even if the value has only been promised, and not actually received.

The value credited to the resource provider account may be less than the amount indicated in the digital asset. For example, the recipient institution computer 540 and/or other entities may charge fees that may be deducted from the provided amount.

For example, the resource provider may receive a digital asset for £1000 from the user. However, the receiving institution computer 540 may charge £20 for the transfer. Accordingly, the resource provider account may only be credited with £980.

At step S528, the recipient institution computer 540 may inform the resource provider computer 530 that a digital asset has been received, and that a certain value has been credited to the resource provider's account. The recipient institution computer 540 may provide remittance data including the payment amount, information about the sender (e.g., the user and/or sending institution computer 560), and any other suitable information to the resource provider computer 630.

At this point, the user computer 510 and/or sending institution computer 560 may also be informed that the transfer was completed. For example, the interaction platform may provide a reconciliation file to the user computer 510 and/or sending institution computer 560.

At step S530, at a later time, settlement for the digital asset value can take place between the sending institution computer 560 and the recipient institution computer 540. For example, the settlement service computer may coordinate the transfer of value. Information relevant to settlement (e.g., enterprise IDs, amount, etc.) can be obtained from the digital asset.

In some embodiments, settlement can include debiting the digital asset value from the user's account at the sending institution computer 560. The digital asset value can also be transferred to a central bank (e.g., a financial institution provided by an entity that manages the asset transfer network or any other suitable entity). Alternatively, the sending institution computer 560 may have an account pre-loaded with funds at the central bank, so the digital asset value does not need to be transferred from the sending institution computer 560 to the central bank at this point (e.g., because funds are already at the central bank).

Settlement can continue by debiting the digital asset value (or a recued settlement value) from a first account (e.g., a first settlement account) associated with the sending institution computer 560 at the central bank, and the value can be credited to a second account (e.g., a second settlement account) associated with the recipient institution computer 540 at the central bank. For example, the sending institution computer 560 and the recipient institution computer 540 may have created settlement accounts with this central bank when enrolling for participation in the asset transfer network, and these accounts may exist specifically for settlement procedures. The first account may be in a first central bank location, which is in a first country (e.g., the United States), while the second account may be in a second central bank location, which is in a second country (e.g., England). Accordingly, the second account may be credited with British Pounds (thereby effecting a currency exchange).

Once the value arrives at the second account associated with the recipient institution computer 540, the recipient institution computer 540 may then credit the resource provider account at the recipient institution with the digital asset value. Alternatively, as described above, the recipient institution computer 540 may have already credited the resource provider account at step S526.

As a result, settlement may not need to travel through multiple correspondent banking relationships. Instead, the funds can be settled between the recipient institution computer 540 and the sending institution computer 560 through the central bank. Further, the recipient institution computer 540 and the sending institution computer 560 may each only maintain one account with the central bank (or other settlement account service provider). The recipient institution computer 540 and the sending institution computer 560 may not have to manage any other correspondent banking relationships, as all transfers may be accomplished through the asset transfer network and central bank. As a result, the recipient institution computer 540 and the sending institution computer 560 may not have to set aside resources for multiple correspondent accounts or otherwise interface with multiple correspondent banks. In some embodiments, each financial institution can maintain multiple accounts at the central settlement entity in order to transact using different currencies. For example, the sending institution computer 560 can have several (e.g., 1-20) accounts, each for a different currency type. As a result, the sending institution computer 560 can settle the transactions with the recipient institution computer 540 using the best suitable currency. For example, the sending institution computer 560 may have an account with value in British Pounds, and can settle directly with the recipient institution computer 540 using British Pounds.

In other embodiments, the digital asset value can be settled through one or more correspondent bank relationships (e.g., instead of through a central bank). For example, settlement can take place through one or more correspondent banks in a first country (e.g., the United States), an international correspondent bank relationship, and one or more correspondent banks in a second country (e.g., England).

In some embodiments, the digital asset may be or include a smart contract that is designed to settle within a predefined period of time (e.g., 5 hours, 1 day, or 1 week). Alternatively, a smart contract may cause the settlement process to execute along with the next batch of settlements, or at a certain time of day. As explained above, the smart contract can be enforced by the administrative node computer 550, the managing entity, a central bank (which can receive a smart contract from an administrative node computer 550), or any other suitable party. After settlement, the digital asset can be destroyed (e.g., deleted or marked as settled). Also, the digital asset can be digitally signed to indicate that settlement was completed, and the transaction record can be stored (e.g., in a database list or a blockchain ledger).

In some embodiments, a number of digital asset transfers can be settled at the same time. Accordingly, a net position can be calculated between the sending institution computer 560 and the recipient institution computer 540. Instead of transferring back and forth the value of each digital asset, a one net total can be transferred to whichever entity is net owed (e.g., based on a certain settlement period including a certain set of digital asset transfers).

As mentioned above with respect to step S520, the digital asset may be provided to the recipient node computer 545 in a number of alternative manners. For example, in some embodiments, instead of providing a single targeted message to the recipient node computer 545, the issuer node computer 565 may distribute the digital asset to several or all nodes throughout the asset transfer network (e.g., all the recipient nodes in the network). In this scenario, the recipient node computer 545 may be one of several nodes that receive the digital asset. The recipient node computer 545 may recognize that the digital asset is intended for the recipient institution computer 540 based on an enterprise ID included in the digital asset.

Alternatively, in some embodiments, the administrative node computer 550 may distribute the digital asset on behalf of the issuer node computer 565. The administrative node computer 550 may provide the digital asset directly to the recipient node computer 545, or may distribute the digital asset to a plurality of recipient nodes (as described above). In other embodiments, the administrative node computer 550 may instead publicly distribute updates about the transaction ledger to one or more nodes. In this scenario, the recipient node computer 545 may review the new digital assets recorded in the updated ledger, and identify any relevant digital assets (e.g., based on enterprise IDs).

In other embodiments, neither the issuer node computer 565 nor the administrative node computer 550 may distribute the digital asset. Instead, the administrative node computer 550 may continually update a ledger of transactions, and the recipient node computer 545 may have access (e.g., real-time access) to the ledger. In this scenario, the recipient node computer 545 may regularly or continually check a central ledger (e.g., hosted by the administrative node computer 550) for relevant transactions.

Additionally, as mentioned above, one or more additional nodes (e.g., administrative nodes, issuer nodes, and/or recipient nodes) may also maintain their own ledger and extend it based on the digital asset transfer. However, in some embodiments, certain entities and nodes may only be able to view a subset of transactions (or meaningful information associated with a subset of transactions), instead of the entire ledger. For example, block bodies can be removed or obscured from some blocks when a certain node accesses a central ledger, or when a ledger update is sent to a certain node. Accordingly, in some embodiments, the ledger may not be entirely public, as access may be restricted and filtered based on the viewing entity.

As mentioned with regard to FIG. 1, the sending institution computer 560 may interact with the asset transfer network in a number of ways. Accordingly, in some embodiments, steps S506-S520 may take place in an alternative manner. For example, instead of contacting the issuer node computer 565 directly, the sending institution computer 560 may communicate about the digital asset with the interaction platform.

In such a scenario, the sending institution computer 560 may send the transaction request to the interaction platform. The interaction platform may then generate the digital asset (instead of the issuer node computer 565), or the interaction platform may request that the digital asset be generated (e.g., by a node in the asset transfer network). Further, the interaction platform (instead of the issuer node computer 565) may generate a digital signature for the digital asset based on the private key of the issuer node computer 565 or the sending institution computer 560. The interaction platform may also play some roles of the administrative node computer 550, such as providing a second digital signature.

Then, the interaction platform may provide the digital asset and corresponding digital signatures to the asset transfer network, thereby publishing the transaction. For example, the interaction platform may provide the digital asset and signatures to the issuer node computer 565 and/or the administrative node computer 550. Once the digital asset arrives in the asset transfer network, the digital asset may be distributed among the nodes and provided to the recipient node computer 545.

Embodiments of the invention have a number of advantages. For example, embodiments provide an asset transfer network with improved speed, security, reliability, transparency, and efficiency. A universal and permissioned network can be well-organized, and can enable efficient messaging across known pathways that facilitates direct value transfers between a sender and a recipient, regardless of location. This organization can reduce the extra communications, as well as remove the mystery of various unknown correspondent bank relationships, present in decentralized legacy systems.

Central enrollment, compliance-screening of participating entities, standardized communications, and universal identifiers that uniquely identify entities can each facilitate a sense of trust in the network and the participating entities. This trust can be further increased knowing that the network validators (e.g., the administrative nodes) can be limited, known, defined in advance, and operated by a trusted party. A distributed ledger can instill confidence that each participating entity has the same information about agreements and transfers that have been made. Similarly, digitally signed digital assets can be highly trusted, as the signatures can be validated to confirm that the sending financial institution has performed proper transaction validation and that a digital asset is legitimately being transferred.

The high level of network trust and digitally signed digital assets can sufficiently reduce transaction risk to allow recipient financial institutions to make a received digital asset value immediately available in the recipient account, even if the value has not yet been settled. This means that a transferred value can be available almost immediately after the transfer is initiated. Thus, regardless of how and when settlement takes place, embodiments allow funds to be available much faster than traditional transfer methods which may not make funds available for withdrawal until settlement is completed (e.g., immediately vs. 3-7 days).

The use of a central settlement service entity (e.g., a central bank) advantageously allows a centralized settlement process. For example, in some embodiments, a sending bank and a receiving bank may each have an account at a central bank. When the sending bank wishes to transfer a value to a receiving bank, the value can be transferred between their respective accounts at the central bank. The accounts can be at a single central bank location in one country, or the central bank can have multiple locations in different countries (e.g., a global bank). Either way, the central bank can coordinate the value transfer from the sending bank account to the receiving bank account. This provides a more streamlined and transparent process than traditional correspondent banking relationships used for international wire transfers. Instead of transferring across multiple correspondent banks (e.g., three, four, five, or more transfer steps across different banks), funds can be settled at the central bank. In addition to simplifying the settlement process, this also advantageously allows each bank to access a global asset transfer network with only one external relationship (e.g., a relationship with the central bank). As a result, a given bank may no longer need to maintain multiple correspondent bank relationships, which can traditionally include twenty or more relationships.

Figure 6:
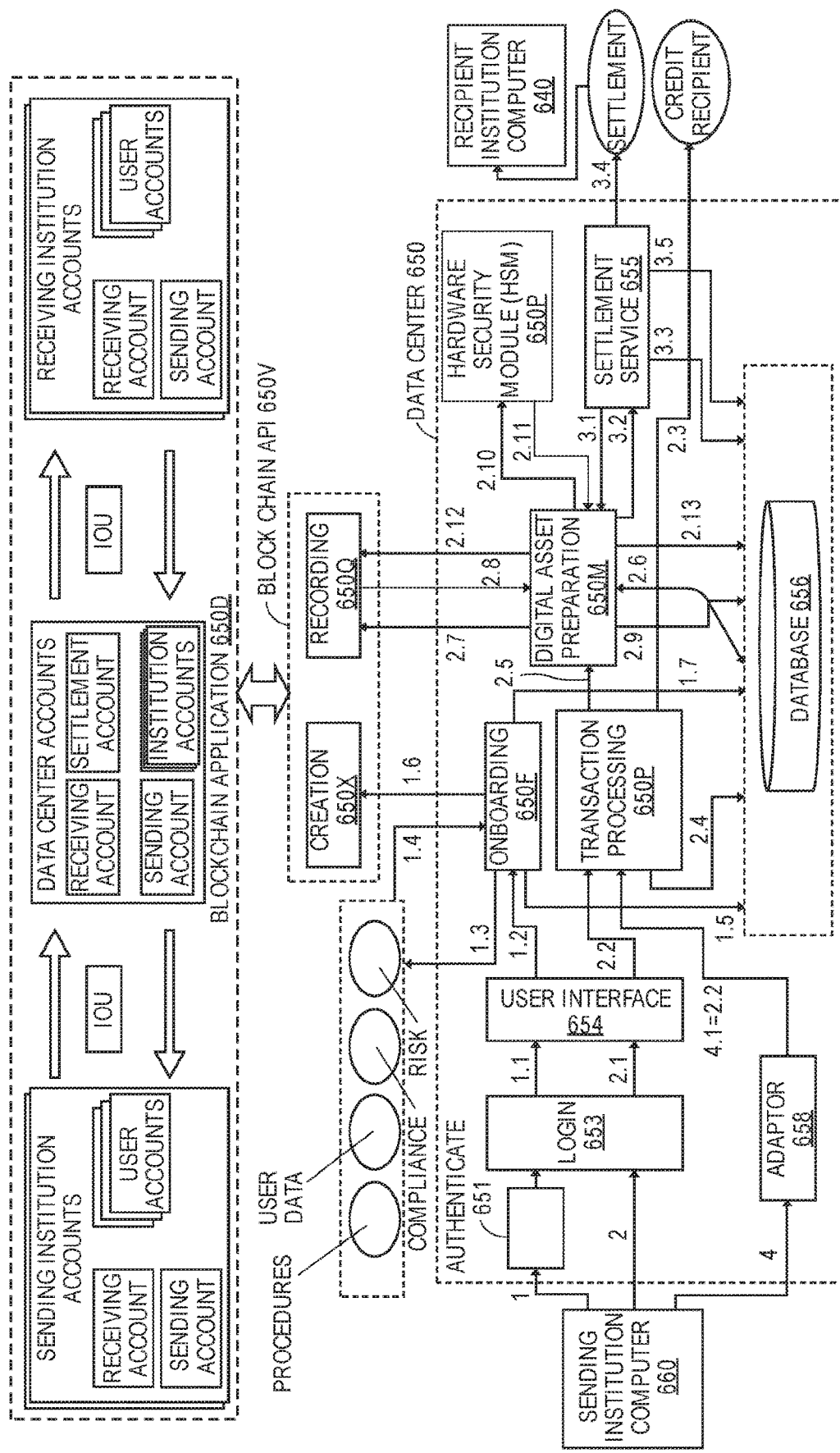
FIG. 6 shows an example of an asset transfer network with additional detail.

FIG. 6 shows an example of an asset transfer network 600 with additional detail. FIG. 6 provides an expanded view of the asset transfer network processes. For example, the center of the figure shows a detailed representation of a data center 650, which in some embodiments can be similar to or the same as an administrative node computer. FIG. 6 also shows how the data center 650 interacts with other entities, such as the sending institution computer 660 and the recipient institution computer 650. Each component shown in FIG. 6 can represent a computer, a software module, a process being implemented, or a cloud-based service.

As mentioned above, in some embodiments, the data center 650 can be representative of an administrative node computer. Further, in some embodiments, in addition to representing an administrative node computer, the data center 650 shown in FIG. 6 can also encompass other components and/or functionality described with respect to FIG. 1, such as the interaction platform 154. For example, the data center 650 can represent the managing entity described above, and can include some or all of the functionality provided by or associated with the managing entity. Accordingly, the data center 650 shown in FIG. 6 can alternatively be referred to as a management computer, a network computer, or a transaction processing computer. In some embodiments, the data center 650 shown in FIG. 6 can also represent other nodes shown in FIG. 1 beyond just an administrative node computer 150, such as the issuer node computer 165 and/or the recipient node computer 145.

FIG. 6 also shows a series of steps for processes performed by the data center 650. The components in the asset transfer network 600 can be described in conjunction with the processes.

For example, the asset transfer network 600 includes a sending institution computer 660, which can interact with the data center 650 in a number of manners. As shown by arrow 1, the sending institution computer 660 can register with the asset transfer network. The data center 650 can first execute an authentication process 651. This can include verifying the identity of the sending institution, as well as providing access credentials (e.g., a username and password) to the sending institution computer 660. The sending institution computer 660 can then perform a login process 653 in order to access the asset transfer network. After a successful login, the sending institution computer 660 may then be able to access a user interface 654 (as shown by arrow 1.1) for interacting with the data center 650.

In some embodiments, before being able to send digital assets, the sending institution computer 660 may first complete on onboarding process 650F. As shown by arrow 1.2, the sending institution computer 660 may provide any necessary information to the data center 650. As shown by arrow 1.3, onboarding can include risk analysis, compliance screening, gathering of user data (e.g., information about the sending institution computer 660 and/or clients of the sending institution), and providing information to the sending institution computer 660 about digital asset network procedures. The onboarding process 650F can be executed by and/or similar to the enrolling module 150F shown in FIG. 2. Also, the risk analysis component can be executed by the risk management computer 157 shown in FIG. 1 and/or the risk module 150H shown in FIG. 2.

As shown by arrows 1.4 and 1.5, once responses are received and onboarding is completed, the data center 650 can store information about the sending institution computer 660 in the database 656. Thus, in some embodiments, the database 656 can be similar to the user database 150Q shown in FIG. 2.

As shown by arrow 1.6, the data center 650 can cause an account to be established for the sending institution computer 660 via a creation module 650X (e.g., for creating new accounts and/or digital assets). For example, the creation module 650X can create an account identifier (e.g., an enterprise ID) to be established that can represent the sending institution computer 660 during digital asset transfers. As shown by arrow 1.7, this account information can also be stored in the database 656.

In some embodiments, after successful registration and onboarding, the sending institution computer 660 can initiate a digital asset transfer. As shown by arrows 2 and 2.1, the sending institution computer 660 can login and access the user interface of the data center 650. As shown by arrow 2.2, the sending institution computer 660 can request a digital asset transfer by providing information about the digital asset transfer (e.g., recipient, amount, etc.) to a transaction processing module 650P.

The transaction processing module 650P can then validate the transaction request (e.g., similar to the validation module 150J in FIG. 2), as well as determine any fees and/or exchange rates to be applied to the digital asset transfer. Then, at step 2.3, the data center 650 can inform the recipient institution computer 660 to credit a recipient account (e.g., a resource provider account) with the final amount (e.g., the digital asset amount minus any fees after currency exchange). Also, as shown by arrow 2.4, the transaction details can be stored in the database 656. Accordingly, the database 656 can be similar to the transaction repository 156 shown in FIG. 1.

When the transaction details are ready, the information can be passed to a digital asset preparation module 650M, as shown by arrow 2.5. The digital asset preparation module 650M can then generate a digital asset based on the transaction details, as well as temporarily store the digital asset in the database 656, as shown by arrow 2.6. Accordingly, the digital asset preparation module 650M can be similar to the digital asset module 150M shown in FIG. 2. The digital asset preparation module 650M can also prepare for storing the digital asset in a blockchain ledger by providing the digital asset to a recording module 650Q of a blockchain application interface 650V, as shown by arrow 2.7. Arrow 2.8 can be a receipt confirmation and/or a prompt for digital signatures.

As shown by arrow 2.10, the digital asset preparation module 650M can prompt a hardware security module 650P for one or more digital signatures. For example, the hardware security module 650P can generate a digital signature using a private key associated with the data center 650. In some embodiments, the hardware security module 650P can also generate a digital signature using a private key associated with the sending institution computer 660. Accordingly, the hardware security module can be similar to the key database 150P and/or the signing module 150K in FIG. 2. The digital signatures can be return to the digital asset preparation module 650M, as shown by arrow 2.11.

As shown by arrow 2.12, the digital signatures and/or completed digital asset can be provided to the recording module 650Q. At this point, the blockchain application interface 650V can forward the digital asset and digital signatures to a blockchain application 650D. The blockchain application 650D can update a blockchain ledger with the new digital asset (e.g., which can include creating a new block), as well as create a smart contract based on the digital asset. For example, as shown in FIG. 6, the blockchain application 650D can create a digital record showing that a value is promised from a sending institution account (or a specific user account within a set of user accounts associated with the sending institution) to a recipient institution account (or a specific user account within a set of user accounts associated with the recipient institution). Accordingly, the blockchain application 650D can be similar to the update ledger module 150L and/or the ledger database 150D).

In some embodiments, as shown in FIG. 6, a value transfer from a sending institution to recipient institution can be accomplished by using a data center (or another central entity) as a mediator. For example, value can be transferred from a sending institution account to an data center account, and then the value can be transferred from the data center account to a recipient institution account.

Once the digital asset is recorded in the blockchain ledger, the data center 650 can store a copy of the digital asset and/or block in the database 656 (e.g., similar to the transaction repository 156 shown in FIG. 1.), as shown by arrow 2.13. Additionally, the data center 650 can send a message to the recipient institution computer 640 (or a recipient node computer), informing that the digital asset was processed, and the transaction value is guaranteed. In some embodiments, the recipient institution computer 640 (or a recipient node computer) can also access a copy of the blockchain ledger in order to detect the newly recorded digital asset (e.g., by viewing a read-only limited-view version of the blockchain ledger stored by the blockchain application 650D).

As shown by arrow 4, in some embodiments, the sending institution computer 660 can contact the data center 650 in a different manner. For example, the sending institution computer 660 can operate an issuer node, and can thereby generate the digital asset and/or generate a digital signature (e.g., using a separate hardware security module). The sending institution computer 660 or issuer node computer can then send the prepared digital asset and digital signature to the data center 650, as shown at arrow 4. An interface (e.g., the adaptor 658) can receive the digital asset and forward it to the transaction processing module 650P. The digital asset transfer process can then proceed as described above, except the data center 650 can skip the steps of generating the digital asset and the digital signature associated with the sending institution. Also, the data center 650 can verify the authenticity of the received digital signature (e.g., similar to the verification module 150G in FIG. 2)

At a later time, after posting a digital asset to the ledger and informing the concerned parties, the data center 650 can coordinate settlement of the digital asset value. For example, after a set amount of time has passed, or when a smart contract is otherwise triggered, the settlement service 655 can cause the value to be settled between a sending institution account and a recipient institution account. Accordingly, the settlement service 655 can be similar to the settlement service computer 155 shown in FIG. 1. In some embodiments, the settlement service 655 can obtain information about new digital assets from the digital asset preparation module 650M, as shown by arrows 3.1 and 3.2. The settlement service 655 can update the database 656 to indicate that settlement is initiated, as shown by arrow 3.3. The settlement service 655 can then cause the value to be transferred, and information the recipient institution computer 640 that the value was settled (e.g., at a central bank), as shown by arrow 3.4. Finally, the settlement service 655 can update the database 656 to indicate that the digital asset value was successfully settled, as shown by arrow 3.5.

Network Topology

Figure 7:
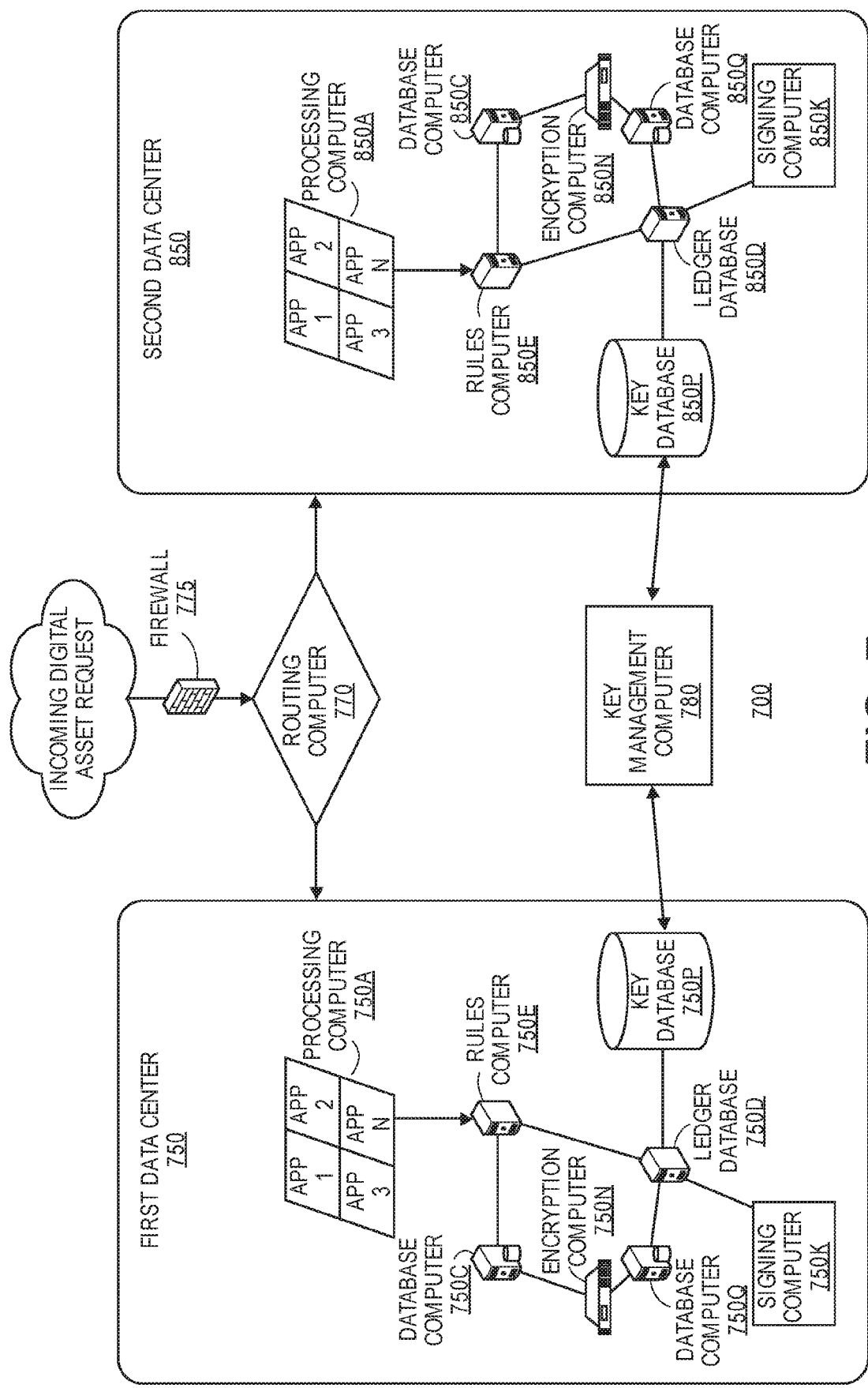
FIG. 7 shows a diagram of an example network topology that can be used with embodiments of the invention.

FIG. 7 shows a diagram of an example network topology that can be used with embodiments of the invention. Embodiments of the invention allow network processes such as registration, digital asset creation, ledger updating, and ledger storing to be distributed. FIG. 7 provides an example configuration for achieving this network distribution and redundancy.

FIG. 7 includes a routing computer 770, a first data center 750, a second data center 850, and a key management computer 780. The routing computer 770 can initially receive digital asset transfer requests (e.g., from a sending institution computer or and issuer node computer) through a firewall 775. The routing computer 770 can then determine which data center should process the digital asset, and can forward the digital asset transfer request to the determined data center.

In some embodiments, a data center can be the same or similar to an administrative node computer (e.g., as described in FIGS. 1, 2, and 6), and each data center can alternatively be referred to as an administrative node computer. For example, similar to an administrative node computer, a data center can administrate an asset transfer network by processing transactions (e.g., validating and signing digital assets) and maintaining a transaction ledger (e.g., a blockchain). Also, as explained above with respect to the data center shown in FIG. 6, a data center can instead represent the managing entity described above, and can further include some or all of the functionality provided by the managing entity. For example, a data center can also encompass other components and/or functionality described with respect to FIG. 1, such as the interaction platform 154. Accordingly, a data center can alternatively be referred to as a management center, a network center, or a transaction processing center (each of which can include one or more server computers). In some embodiments, a data center can also represent other nodes shown in FIG. 1, such as the issuer node computer 165 and/or the recipient node computer 145.

As shown in FIG. 1 and FIG. 4, an asset transfer network can include multiple administrative node computers. Similarly, FIG. 7 includes multiple data centers. Incorporating multiple data centers into an asset transfer network provides several advantages. For example, the burden of processing incoming digital assets can be divided among the data centers, such that digital assets can be processed quickly. Multiple data center locations provide multiple possible destinations for incoming digital asset requests, and the routing computer 770 can intelligently route each incoming digital asset to the most appropriate data center. For example, the routing computer 770 can send a digital asset request to the data center with the shortest backlog (e.g., to evenly distribute processing loads), to the data center closest to the requester (e.g., in the case where data centers are geographically distributed), or to a specific data center based on any other suitable consideration. As a result, incoming digital assets can be validated, signed, posted to a blockchain ledger, and otherwise processed more efficiently.

Additionally, each data center can store and maintain a separate copy of the blockchain ledger. As a result, blockchain ledger security is increased through redundancy.

While digital assets are initially processed by a single data center, the data centers can share information about newly approved digital assets (e.g., or newly created blocks) with one another. For example, the first data center 750 can provide updated messages to the second data center 850 about new digital assets and/or new blockchain blocks. The first data center 750 can also receive similar update messages from the second data center 850 about new digital assets or blocks created or completed at the second data center 850. As a result, both data centers can store complete copies of the transaction ledger, even if each only processes a portion of digital assets.

Further, when the second data center 850 receives a ledger update from the first data center 750, the second data center 850 can validate each new digital asset and/or block before updating its own ledger. Accordingly, each digital asset and/or block can be validated and approved by each data center, thereby providing additional opportunities to detect inappropriate digital assets and behavior. Thus, there are additional lines of defense after a digital asset is initially validated and recorded in a blockchain block at the first data center 750.

In combination, the various data centers can create a complete ledger that is centrally-managed by the network operator. However, separating the individual data centers and placing them in different locations allows transaction processing and block creation to be distributed. As a result, transaction processing throughput is increased, while the immutable ledger is maintained. The blockchain ledger data is distributed for redundancy, yet still under the control of a single, central network operator (and thus not vulnerable to malicious changes).

FIG. 7 depicts a network with distributed data centers that can create blockchain blocks independently, and then update one another in order to synchronize their respective blockchain records. For exemplary purposes, FIG. 7 is described within the context of transferring digital assets. However, embodiments equally apply to any other suitable communication and/or record-keeping network that can utilize distributed data centers. For example, distributed data centers can be applied to asset transfer networks that facilitate the transfer of any suitable type of digital asset (or other value), such as access credentials, event tickets, property rights, currency, game credits, mobile phone minutes, digital media, currency, etc.

Even more generally, distributed data centers can be used for recording any suitable type of data element. For example, data elements representing updated medical information, information about a newly issued college degree, exam results, vehicle registration data, signed waivers, and/or any other suitable type of recordable information can be tracked and recorded. Any suitable type of digital record can be used to track new data elements. For example, instead of a blockchain ledger, data elements can be stored in simple list format.

While FIG. 7 shows two data centers (i.e. the first data center 750 and the second data center 850), any suitable number of data centers can be included in an asset transfer network. Including additional data centers can further improve network efficiency and ledger redundancy.

As shown in FIG. 7, the first data center 750 can include a number of components. These components can be similar to administrative node computer components shown in FIG. 2, and/or similar to data center components shown in FIG. 6. Instead of illustrating all the components in FIG. 2 and FIG. 6, FIG. 7 is provided to demonstrate how multiple distributed data centers can operate at the same within an asset transfer network. The first data center 750 components shown in FIG. 7 include a processing computer 750A including one or more processing applications, a rules computer 750E, a signing computer 750K, a ledger database 750D, a key database 750P, one or more additional databases (e.g., database computer 750C and database computer 750Q), an encryption computer 750N, and any other suitable hardware or software modules. Embodiments allow each of these components to take the form of separate server computers. Alternatively, in some embodiments, one or more of these components can take the form of software modules executed on one or more server computers. In any case, as a whole, the first data center 750 can be referred to as a first data center computer. Similarly, the second data center 850 can be referred to as a second data center computer.

The processing computer 750A can include hardware processors and/or software modules for receiving and processing digital asset transfer requests. For example, the processing computer 750A can receive and validate a digital asset, obtain a digital signature for a digital asset, add a digital asset to a ledger (e.g., create a new blockchain block that includes the digital asset), and perform any other suitable task for processing digital assets. The processing computer 750A can also facilitate the network registration of other entities. In some embodiments, the processing computer 750A can perform any activities described above with respect to an administrative node computer. For example, the processing computer 750A can perform activities associated with some or all of the modules included in the computer readable medium of FIG. 2.

The processing computer 750A can include one or more processing application modules, which are represented in FIG. 7 by App 1, App 2, App 3, and App n. These application modules can represent different hardware processors or virtual machines for receiving and processing different digital asset transfer requests. The different processing application modules can be used to process multiple incoming digital assets at the same time. The processing application modules can divide processing tasks to promote load balancing.

In some embodiments, the processing computer 750A can include instructions for, after creating a new block or otherwise adding a new digital asset to the transaction ledger, sending information about the record update (e.g., a new block) to the second data center 850. Accordingly, the processing computer 750A can perform the functions described with respect to the update ledger module 150L in FIG. 2. These ledger updates can be distributed after each digital asset is minted, after each block is created, every second, every 10 seconds, every minute, or at any other suitable time interval. Embodiments allow a new block to include information about a single digital asset, ten digital assets, every digital asset created within a certain timeframe, and/or any other suitable number of digital assets.

Additionally, in some embodiments, the processing computer 750A can include instructions for receiving information about newly completed digital assets and/or blocks from the second data center 850, as well as validating these digital assets and/or blocks. For example, the processing computer 750A can validate the authenticity of each digital asset in a block by validating accompanying digital signatures. The processing computer 750A can also validate each blockchain block by validating the block header. For example, the processing computer 750A can confirm that the block header is the output of a hashing algorithm when some or all of the block body data is input to the hashing algorithm. The processing computer 750A can further confirm that each block properly relates to the previous block. For example, the processing computer 750A can make sure a link to the previous block, such as the previous block header, is included in the block body.

The rules computer 750E can include digital asset processing instructions, and may include logic and rules specifically associated with the first data center 750. In some embodiments, the rules computer 750E can store the instructions used by the processing computer 750A. For example, the rules computer 750E can store instructions similar to or the same as one or more of the modules included in the computer readable medium of FIG. 2. In some embodiments, the rules computer 750E can also include instructions for transaction settlement, or can interact with a settlement service (e.g., the settlement service computer 155 in FIG. 1).

The ledger database 750D can store information about processed and issued digital assets. For example, a blockchain ledger of transactions can be stored at the ledger database 750D. In some embodiments, the ledger database 750D can be similar to or the same as the ledger database 150D in FIG. 2.

The key database 750P can include one or more encryption keys associated with one or more entities. For example, the key database 750P can include a first data center 750 private key for creating digital signatures. The key database 750P can also include one or more public keys associated with other entities (e.g., issuer nodes and recipient nodes) for validating digital signatures and digital assets. In some embodiments, the key database 750P can take the form of a hardware security module (HSM). In some embodiments, the key database 750P can be the same as or similar to the key database 150P in FIG. 2.

The signing computer 750K can be configured to create digital signatures using private keys and/or validate digital signatures using public keys. The signing computer 750K can be used to digitally sign a digital asset, a blockchain block, an entire blockchain ledger, and/or any other information that may need to be verified. In some embodiments, the signing computer 750K can access encryption keys stored at the key database 750P. In some embodiments, the signing computer 750K can be the same as or similar to the signing module 150K in FIG. 2.

The encryption computer 750N can perform any suitable encryption services. For example, ledger updates sent to the second data center 850 can be encrypted, and likewise ledger updates received from the second data center 850 can be decrypted.

The database computers 750C and 750Q can be used to store any suitable information. For example, the database computer 750C can store a backup ledger of transactions (e.g., similar to the database 656 in FIG. 6), while the database computer 750Q can store user data (e.g., similar to the user database 156Q in FIG. 2) and/or node information (e.g., similar to the node database 156C in FIG. 2). In some embodiments, one or more database computers can be used to store application metadata, logic and rules for processing transactions, temporary transaction data while a digital asset is being processed, and/or a set of digital assets for which a block is being created.

In some embodiments, The first data center 750 and the second data center 850 can include similar components and/or functionality. Accordingly, in some embodiments, any description of the first data center 750 can equally apply to the second data center 850, and any description of the second data center 850 can equally apply to the first data center 750.

The key management computer 780 can control the distribution and exposure of encryption keys. For example, when a sending institution (or any other suitable entity) registers with the asset transfer network, a key pair associated with the sending institution can be established. The key management computer 780 can distribute information about the new key pair to one or more data centers. For example, the sending institution may register with the network via the first data center 750. The key management computer 780 can obtain the key pair from the first data center 750 and provide it (along with other registration details) to the second data center 850. As a result, both the first data center 750 and the second data center 850 can be able to validate digital signatures created by the sending institution, and otherwise process digital asset transfer requests received from the sending institution.

Figure 8:
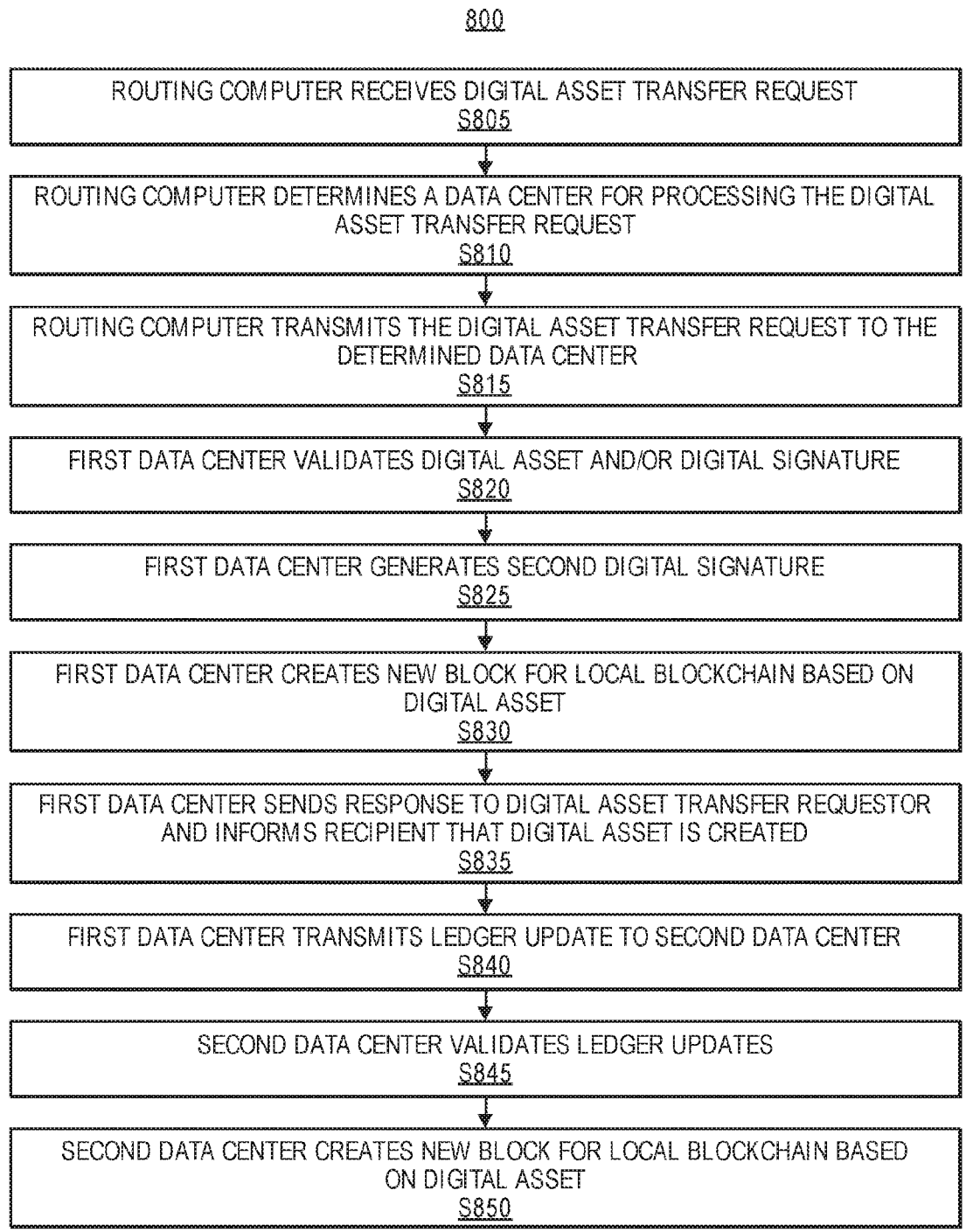
FIG. 8 shows a flow diagram illustrating a method for processing digital assets in an asset transfer network with multiple data centers, according to embodiments of the invention.

A method 800 for processing transactions and combining digital records in an asset transfer network with multiple data centers can be described with respect to FIG. 8, according to embodiments of the invention. The method describes storing digital assets in a blockchain ledger. However, embodiments can also be used for recording other types of data elements.

As explained above, a sending institution computer, an issuer node computer, or any other suitable entity may submit a digital asset transfer request in order to send a digital asset to a recipient. In some embodiments, an issuer node computer can create a digital asset, digitally sign the digital asset, and include the digital asset and signature in the request in order to obtain validation and approval of the digital asset from a network administrator (e.g., as described with respect to step S508 in FIG. 5).

At step S805, which can be similar to step S510 in FIG. 5, the routing computer 770 can receive the digital asset transfer request through a firewall 775. For example, in some embodiments, all digital asset transfer requests can be sent directly to the routing computer 770. In other embodiments, digital asset transfer requests can instead be sent to a data center (e.g., the closest data center), and each data center can include a routing module.

At step S810, the routing computer 770 can determine a data center for processing the digital asset transfer request. The determination can be based on a number of factors. For example, the routing computer 770 can send the digital asset transfer request to the closest data center (e.g., for faster transmission and processing). The routing computer 770 can instead prioritize load balancing and send the digital asset transfer request to the data center with the most available processing power, or the most available processing application modules.

In some embodiments, the routing computer 770 can also assign a priority level to an incoming digital asset transfer request. For example, digital asset transfer requests associated with a certain entity (e.g., a certain sending institution, issuer node, user, recipient, etc.) can be given higher priority for faster processing.

Additionally, in some embodiments, the routing computer 770 can determine whether a digital asset transfer request should be processed or rejected. For example, a request that is improperly formatted or associated with an unknown requestor may be rejected immediately.

At step S815, the routing computer can transmit the digital asset transfer request to the determined data center. For example, the digital asset transfer request may be sent to the first data center 750. In some embodiments, the routing computer 770 may transmit the digital asset transfer request only to the first data center 750, and not to any other data centers. The first data center 750 can then process the request, and can later provide information about the processed digital asset to other data centers.

At step S820, the first data center 750 can validate the digital asset, the digital signature, and/or any other suitable information. For example, the first data center 750 can also confirm that the sending entities (e.g., issuer node computer and sending institution computer) are properly registered and in compliance with processing rules. In some embodiments, step S820 can be similar to step S512 in FIG. 5.

In some embodiments, the digital asset transfer request may not include a digital asset. In this case, step S820 can include generating the digital asset and/or generating an additional digital signature associated with a sending entity.

At step S825, the first data center 750 can generate a second digital signature for the digital asset (e.g., using a private key associated with the first data center 750). The first data center 750 may also create a smart contract and/or perform any other suitable transaction processing tasks. In some embodiments, step S830 can be similar to step S514 in FIG. 5.

Accordingly, the first data center computer can process a first digital asset that indicates the transfer of a value from a sender to a recipient by performing steps S820-S825, as well as any other suitable steps.

At step S830, the first data center 750 can add the digital asset to a transaction ledger, which may be stored locally at the first data center 750 (e.g., at the ledger database 750D). For example, the first data center 750 can create a new blockchain block with a block body and a block header. The block body can include record information (e.g. information about the digital asset) and optionally additional digital assets being processed in a similar timeframe. The block body can also include a reference to a previous block, such as a previous block header. In some embodiments, some or all of the block body information can be used to generate the block header. For example, the block body can be input into a hashing algorithm, an encryption algorithm, and/or any other suitable data manipulation process, and some or all of the output can be used as the block header. In some embodiments, step S830 can include ledger building processes similar to those described with respect to step S516 in FIG. 5.

For the sake of description, this step can be considered creating a first block for a first blockchain. However, the term first does not necessarily mean this is the very beginning of the blockchain. Instead, the first blockchain can be an existing blockchain with a number of existing blocks, and the first block can be appended to the end of the existing blockchain.

At step S835, the first data center 750 can send a response to the requestor of the digital asset transfer (e.g., an issuer node computer or a sending institution computer). For example, the first data center 750 can send a binary response indicating whether the digital asset was successful processed (e.g., and added to the transaction ledger) or rejected. In some embodiments, step S830 can be similar to step S516 in FIG. 5.

Additionally, the first data center 750 can send a message to a recipient (e.g., a recipient node computer or a recipient institution computer) informing that a digital asset has been processed which indicates that a value will be provided to the recipient. In some embodiments, this aspect of step S830 can be similar to step S520 in FIG. 5. However, the first data center 750 may send message, instead of an issuer node computer. Accordingly, both the sending party and the receiving party can be informed that the digital asset is posted to a blockchain ledger, and optionally that a smart contract has been established.

At this point, the digital asset can be fully processed and ledger updated locally at the first data center 750. However, in order to maintain a uniform transaction ledger across the network, the first data center 750 can proceed to update one or more other data centers with information about the digital asset and/or other ledger updates.

At step S840, the first data center 750 can transmit a message with information about recent ledger updates to the second data center 850. For example, the message can include information identifying the first data center 750 (e.g., distinguishing it from other data centers), information about a new digital asset, information about a new block (e.g., a block header and/or block body data), a timestamp, a return address, and/or any other suitable information. The message can also include a request for information about recent blockchain ledger updates at the second data center 850. In some embodiments, the first data center 750 can encrypt some or all of the ledger update information for sending (e.g., using a symmetric key or a second data center 850 public key). Accordingly, the first data center computer can send a message to a second data center computer indicating that the first block was created for the first blockchain, where the message includes the block header, the block body, and/or any other suitable information.

At step S845, the second data center 850 can receive the ledger update information from the first data center 750, and then validate the transaction information or perform any other suitable processing. For example, the second data center 850 can validate each digital signature associated with the new digital asset (e.g., using relevant public keys). The second data center 850 can also confirm that a block header is a correct hash of the digital asset information, the previous block header, and/or other suitable block body information. The second data center 850 may further verify that the previous block indicated in the current block body is the correct and expected previous block. In some embodiments, the second data center 850 can first decrypt the update message from the first data center 750 (e.g., using a corresponding symmetric key or private key).

While the second data center 850 can validate the digital asset and/or block, in some embodiments, the second data center 850 may not repeat all of the transaction processing performed by the first data center 750. For example, the second data center 850 may not check that each entity associated with the digital asset is registered with the asset network and conforming to network rules. Additionally, the second data center 850 may not create another digital signature for the digital asset and/or block. However, in other embodiments, the second data center 850 can fully repeat transaction processing and perform some or all of these steps.

At step S850, the second data center 850 can add the digital asset and/or block to its own locally stored transaction ledger, or otherwise update the ledger with the ledger update information received from the first data center 750. For example, the second data center 850 can copy the block received form the first data center 750 and add the it to its own blockchain ledger. This can be considered creating a second block (e.g., because it is for a different blockchain), but the second block is the same as the first block. As explained further below, the second data center 850 can the entire block (e.g., both the header and the body) to the blockchain, or the second data center 850 can just use the block header.

In some embodiments, the second data center 850 can create a new transaction block including the one or more digital assets received from the first data center 750. The new block can include additional digital assets being processed at the second data center 850, or can just include digital assets received from the first data center 750. In some embodiments, the second data center 850 can also generate an additional digital signature (e.g., using a second data center 850 private key) to indicate that the information received from the first data center 750 was validated and approved by the second data center 850. Accordingly, the second data center computer can add the first block header, block body, and/or digital asset records to a second blockchain In some embodiments, if the second data center 850 is unable to validate the digital asset, block header, or block body received from the first data center 750, the second data center 850 can reject the ledger update information and not add it to the second data center 850 ledger. In this case, the second data center 850 can also inform the first data center 750 that the ledger update was rejected, and the first data center 750 may then audit its own transaction ledger, possibly identifying and removing (or flagging) inappropriate transaction records.

As explained above, the second data center 850 can also receive and process digital asset transfer requests, create new blocks, and provide ledger updates to the first data center 750. In other words, a second data center computer can process a second digital asset, and then record the second digital asset by creating another block in the second blockchain. This new block can be referred to as a third block, as it is created after the first block (at the first blockchain) and the second block (the copy of the first block at the second blockchain). The second data center can then send a second message to the first data center computer indicating that the second digital asset was recorded in a third block at the second blockchain. When the first data center computer receives the second message from the second data center computer, the first data center computer can update the first blockchain ledger by adding a fourth block, which can be a copy of the third block (e.g., the header and/or body).

As a result, both the first data center 750 and the second data center 850 can update their local transaction ledgers so that they match, even if a digital asset is initially received and processed at just one of the data centers. Each data center can include a transaction ledger with the same list of digital assets. For example, each data center can have a similar blockchain with the same list of blocks (e.g., headers and/or bodies). Accordingly, each data center can have a complete list of all digital assets and/or blocks created throughout the digital asset network.

In some embodiments, each data center can have an identical blockchain ledger with a matching set of digital asset records. In other embodiments, each data center can have a blockchain ledger that includes all digital assets, but the different blockchain ledgers can have digital assets and/or blocks listed in a different sequence. As a result, the block headers may also have different values (e.g., if the headers are generated based on the digital assets recorded in the block).

In some embodiments, the data centers can achieve exactly matching blockchain ledgers (e.g., blocks with the same headers, same digital asset ordering, etc.) by alternating when they send each other ledger updates. For example, the first data center 750 can send a ledger update (e.g., with a first block) to the second data center 850, then the second data center 850 can send a ledger update (e.g., with a second block) to first data center 750, then the first data center 750 can send another update (e.g., with a third block) to the second data center 850, and so forth. The updates can alternative in this fashion in a regular, periodic pattern (e.g., an update is sent every 10 seconds, 30 seconds, 1 minute, 10 minutes, etc.), and the blocks can reference each other in the appropriate sequence.

In other words, the second data center 850 can add the exact first block received from the first data center 750 to its own ledger. Then, the second data center 850 can create a second block based on digital assets it has processed locally (e.g., within the last minute) and add the second block to its ledger. The second block can reference the first block (e.g., by generating the second block header based in part on the first block header), such that second block is subsequent to the first block in the blockchain. The second data center 850 can then send the second block to the first data center 750. Once the first data center 750 receives the second block and adds it to its blockchain ledger, the cycle can repeat. For example, the first data center 750 can wait to create a third block (e.g., based on newly processed digital assets) until after it receives the second block and adds it to its ledger. Once the second block is added, the third block can be created such that it references the second block. The first data center 750 can then send the third block to the second data center 850, and the process can continue to cycle in this manner. As a result, the first data center 750 and second data center 850 can have blockchain ledgers with the same blocks ordered in the same sequence.

As explained above, there can be additional data centers, such as a third data center. In this case, the first data center 750 can distribute ledger updates to each additional data center directly or indirectly. For example, the first data center 750 can send ledger update messages directly to each data center. Alternatively, the first data center 750 can send one ledger update message directly to the second data center 850, which can then forward the ledger update message to the third data center (and so forth). The ledger update message sent to the second data center 850 can include an instruction to forward the update to the third data center.

In further embodiments, different data centers can have slightly different configurations. For example, different data centers may have different rules and procedures for processing digital assets, building blockchains, and/or sharing ledger information. Data center rules can be adjusted based on a data center processing power, location, affiliation, or any other suitable reason. For example, network end users, a specific financial institution, or any other suitable entity may desire to restrict ledger information for privacy, or otherwise desire augmented data center operations.

Figure 9:
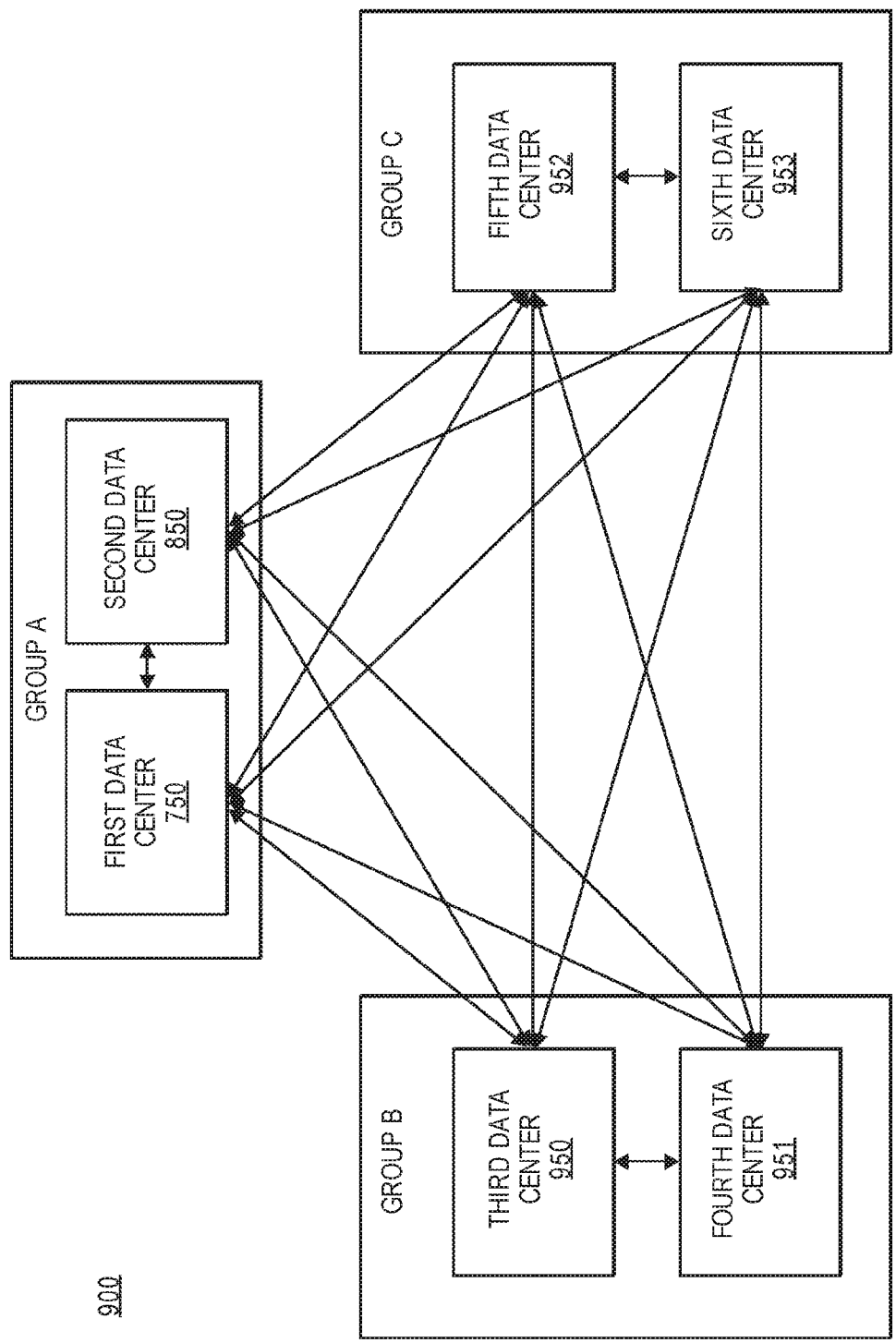
FIG. 9 shows a diagram of an asset transfer network with different groups of data centers, according to embodiments of the invention.

For illustrative purposes, FIG. 9 shows a diagram of an asset transfer network with different groups of data centers. FIG. 9 includes three groups (A, B, and C), and each group includes two data centers.

In some embodiments, the groups can be separated based on processing power and database storage capacity. For example, group A may include data centers that are configured for high-volume digital asset processing, and thus can receive larger amounts of digital asset transfer requests (e.g., from a routing computer). Additionally, group A may include data centers that can store, reference, and otherwise manage more detailed blockchain ledgers. In contrast, group B may include data centers that can process fewer digital asset requests, and that can only manage more limited blockchain ledgers. As a result, group B may not include comprehensive transaction data for every digital asset in the blockchain ledger, or may not include all block bodies.

In other embodiments, the groups can be separated based on geographical location. For example, group A can include data centers located in China, group B can include data centers located in the United States, and group C can include data centers located in the United Kingdom. Alternatively, the groups can be separated based on institutions with which they are affiliated. For example, group A can include data centers associated with a first financial institution, group B can include data centers associated with a second financial institution, and group C can include data centers associated with a third financial institution. Any other suitable type of grouping can take place, such as groupings based on government versus private affiliation, groupings based on transaction type (e.g., person-to-business, person-to-person, and business-to-business), etc.

The different groups of data centers can include different transaction processing rules and procedures. For example, data centers in group A can be configured to process a certain volume or type of digital assets, or digital assets associated with a certain region. Accordingly, the routing computer 770 can determine to send certain digital asset transfer requests to the data centers in group A if the incoming request is associated with entities in a certain region, or if the incoming request has any other specific quality for which group A is designed.

In addition, two data centers within the same group may interact differently with each other than they do with a third data center in a different group. For example, group B may not be configured to receive and store ledger updates from group A with comprehensive transaction details or full block information (e.g., due to processing or storage limitations). Additionally, group A may be associated with an entity (e.g., an organization, service provider, or region) that does not want transaction data to be shared outside the group. Accordingly, the first data centers 750 and the second data center 850 in group A can be configured to share transaction data with one another, but not with other data centers in other groups. For example, information in the body of a block or digital asset may not be shared outside the group, such as the date and time of the transfer, the transfer amount, and identification information for the participants of the transfer (e.g., the sender and the receiver of the transfer amount).

In some embodiments, while transaction data and block bodies may not be shared, block headers may still be shared with data centers outside of group A, since a block header may not convey meaningful transaction information. For example, a block header may be a hashed version of transaction data (e.g., the block body), where the transaction data cannot be derived from the one way hash. In some embodiments, subsequent blocks or block headers can be generated based in part on the previous block header. Accordingly, sharing block headers enables all the data centers, regardless of group association, to continue building a synchronized blockchain.

Accordingly, in some embodiments, data centers in group A may send ledger updates the other data centers in other groups, but the transaction data or block body can be removed (or obscured) in a similar manner as described above with respect to light nodes and filtered ledgers. However, here the transaction data or block body is removed when a data center (e.g., an administrative node) of first group is viewing ledger data created at a data center of a second group, as opposed to when non-administrative entity such as an issuer node or recipient node is viewing a ledger. In other words, a single central entity that maintains the ledger may restrict itself from viewing some transaction data and block body information. This is possible because the single central entity can be implemented as a distributed set of data centers with different capabilities, purposes, and/or affiliations.

Figure 10:
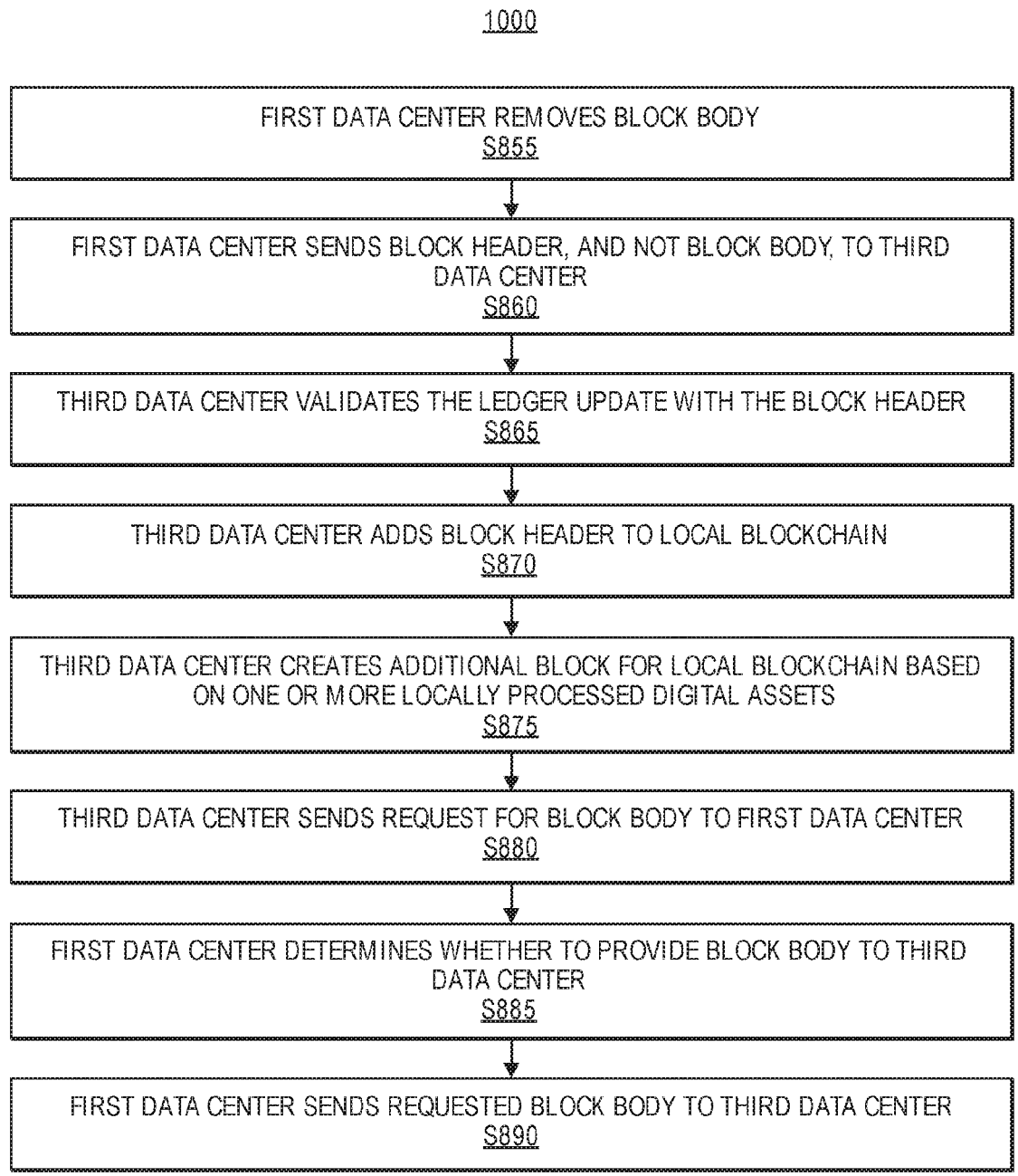
FIG. 10 shows a flow diagram illustrating a method for distributing ledger updates to data centers of different groups, according to embodiments of the invention.

A method 1000 for distributing limited ledger updates to data centers with different rules or with a different association can be described with respect to FIG. 10, according to embodiments of the invention. The method describes storing digital assets in a blockchain ledger, and sharing some information between blockchain ledgers. However, embodiments can also be used for recording other types of data elements, and sharing some information between records.

In the method 1000, data centers in group A may share transaction data (e.g., block body data) with one another, but not with data centers of other groups, as described above. Accordingly, as described above for steps S805-S850 in the method 800, the first data center 750 can receive and process digital asset transfer requests, create a new block for a blockchain, and share information about the processed digital assets and new block with the second data center 850 (which is in group A). The first data center 750 may then prepare to send a ledger update to a third data center 950 in group B, but may first adjust the ledger update message (e.g., by removing transaction data from the message).

At step S855, the first data center 750 can remove the transaction data from the ledger update message. For example, the first data center 750 can remove digital asset information from the ledger update message, such as information identifying the sender or recipient, a transfer value, a time and date, and/or any other suitable information. This can include removing some or all of the block body data from the message. However, the first data center 750 does not remove the block header (or other suitable transaction identifier or a transaction group identifier).

At step S860, the first data center 750 can send the ledger update message with the removed transaction data to the third data center 950. For example, the first data center 750 can send the block header, but not the block body, to the third data center 950. As a result, the third data center 950 can receive a block header (or other suitable ledger entry identifier) without a block body (or other meaningful digital asset information) leaving group A. Even in the case where the block header was computed based on the block body (e.g., using a one-way hash and/or encryption), the third data center 950 may not be able to derive the block body from the block header (e.g., due to a one-way hash, or because the third data center 950 does not have access to the necessary keys for decryption).

At step S865, the third data center 950 can validate the block header and/or other ledger update information received from the first data center 750. For example, the third data center 950 may confirm that the header has an appropriate length or pattern, or verify it using a zero-knowledge proof.

In some embodiments, the third data center 950 can receive a digital signature created by the first data center 750 for a digital asset or block, and the third data center 950 can validate the digital signature using a public key associated with the first data center 750. However, the third data center 950 may not perform some of the same types of validation or as many validation steps as the second data center 850 performs in step S845 of FIG. 8, since the third data center 950 may not have access to the block body.

At step S870, the third data center 950 can add the block header to its locally stored ledger. For example, the third data center 950 can create a new block for the local blockchain. The new block may include the received block header, but not the block body (e.g., because it was not provided). In some embodiments, the new block may only have a header (e.g., which can be the same as the received header), and the new block may not have any information in its block body.

The block header can be used as a link for connecting future blocks to the blockchain. For example, when the third data center 950 generates a subsequent block for digital assets processed locally, the subsequent block header can be generated based in part on the block header received from the first data center 750.

For example, at step S875, the third data center 950 can complete processing for one or more local digital assets and add them to the local transaction ledger. This can include generating an additional block for the local blockchain based on the locally processed digital assets. In some embodiments, the block body can include information about the locally processed digital assets, the previous block header (which is the header received from the first data center 750), a timestamp, information identifying the third data center 950 as the block creator, and/or any other suitable information. Then, embodiments allow the block header for the block to be created by hashing, encrypting, or otherwise manipulating some or all of the information in the block body. As a result, the block header received from the first data center 750 is referenced by a subsequent block and thereby incorporated into the string of blocks and block headers at the third data center 950 blockchain.

Thus, the blockchain at the third data center 950 can continue to build using correct references to previous blocks, and the blockchain can be complete in that is includes some linking information (e.g., a header) about every block created in the network, even if the block body data is removed. While blockchain ledgers stored at different data centers may not exactly match due to missing digital asset information (e.g., missing block bodies), they can at least have matching block headers.

The third data center 950 may, at a later time, desire to reference the first data center's blockchain. For example, the third data center 950 may seek to obtain the transaction data or block body that was removed, or to confirm that a specific digital asset was issued (e.g., in response to a transaction dispute).

At step S880, the third data center 950 can send a request for transaction data or the entire block body to the first data center 750. The third data center 950 can indicate that wants to receive transaction data for transactions that took place on a certain day (or other suitable timeframe), or transaction data that matches some specific information (e.g., a transaction between a specific sender and recipient, or including a certain enterprise ID).

At step S885, the first data center 750 can determine whether to provide the transaction data (or entire block body) to the third data center 950. For example, the first data center 750 can analyze rules regarding the amount of information that can be released upon request (e.g., restrictions based on the type of requesting data center, restrictions related to the age of the transaction, etc.). The first data center 750 can also determine whether or not it possesses the desired transaction data (e.g., a transaction with specified parameters).

At step S890, the first data center 750 can send the requested transaction data (or entire block body) to the third data center 950, if it determined this action is acceptable. In other embodiments, instead of sending actual digital asset records or block bodies, the first data center 750 can instead send a binary response indicating whether or not a digital asset with specified parameters exists in the ledger.

In alternative embodiments, instead of removing the block body, the block body (or the transaction data) can be obscured. For example, at step S855, the first data center 750 can obscure the block body. This can include encrypting some or all of the block body, hashing the block body, replacing the block body with false or meaningless information, or otherwise obscuring the record information. Then, at step S870, the third data center 950 can add the block header and the obscured block body to its blockchain ledger. In some embodiments, if the block body is encrypted the third data center 950 may be able to obtain a key for decrypting the block body. For example, at step S890, the first data center 750 could provide a key for viewing the block body information.

Thus, using separate data centers can allow a single asset transfer network to have different customizable features, and to be used across different groups, even if a group does not want transaction information or block bodies to be shared with other groups. For example, group can effectively operate a local blockchain (e.g., maintained by one or more data centers in that group). Block headers and other non-restricted information can still be shared outside of group for some or all transactions, but block bodies may not be shared. Accordingly, each data center can still include a master set of block headers that tie together the different local blockchain ledgers, while the actual block bodies with transaction record information can be kept inside the group.

As explained above, embodiments allow these types of localized and restricted blockchain ledgers to be for any type of application or entity that benefits from enhanced local privacy. For example, a certain financial institution may wish to protect information about its client's transactions. Accordingly, the financial institution may maintain its own blockchain ledger, and may only distribute block headers (and non-sensitive transaction data) to a central network-operating entity or other institutions.

As mentioned above, data centers of different groups can have a matching ordered string of blockchain headers. However, because each data center may only have a partial view of the total set of block bodies, different groups of data centers might not have fully matching blockchain ledgers.

Figure 11:
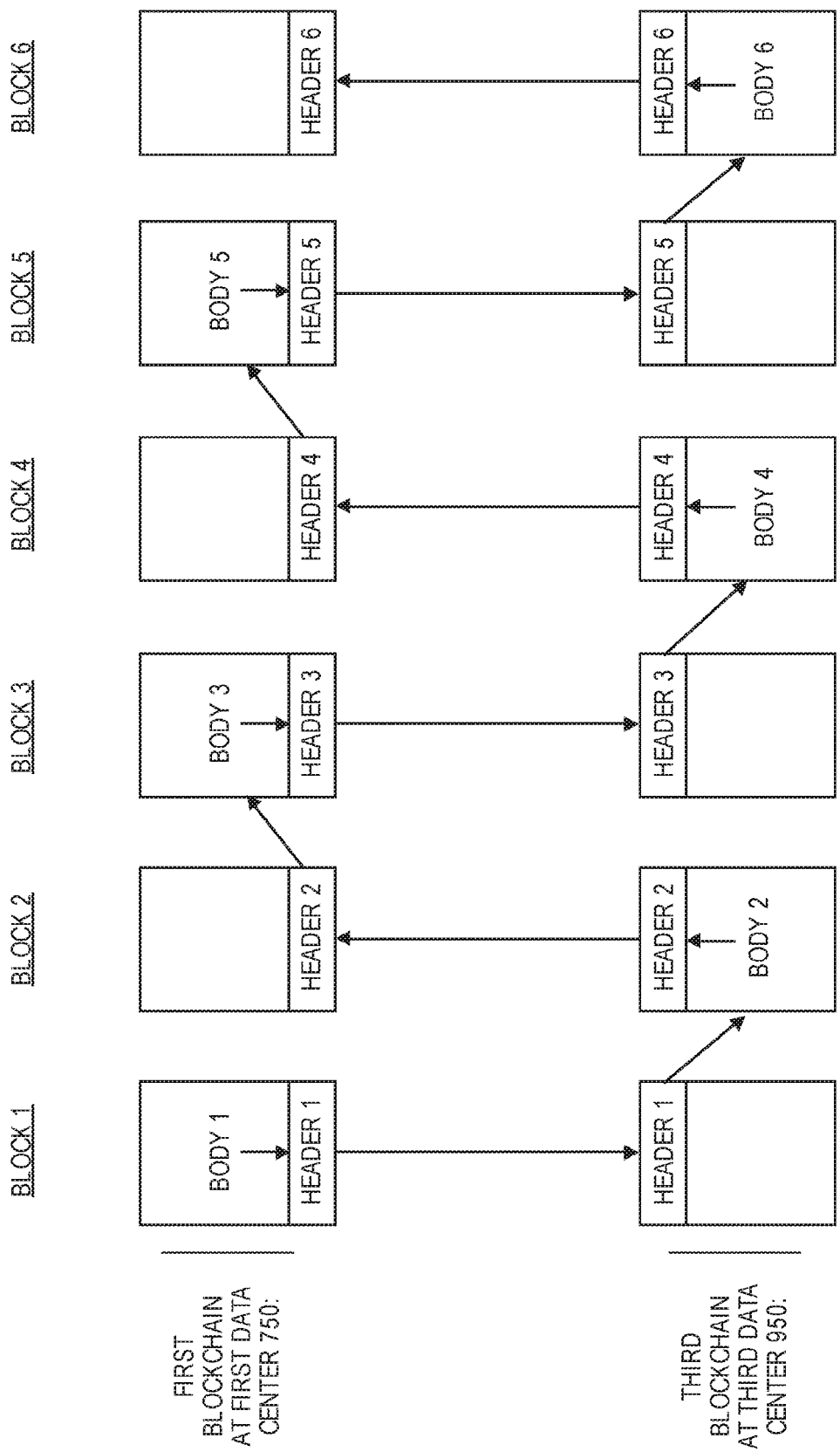
FIG. 11 shows a diagram of blockchain ledgers that partially match, according to an embodiment of the invention.

An example of synchronized, yet only partially-matching blockchain ledgers is shown in FIG. 11. Six successive blocks from a blockchain are shown. The blocks can represent a network-wide blockchain ledger. While the blockchain ledger can represent all transaction across the network, each data center can construct its own copy of the blockchain, and may have a limited view of the transaction data within the blockchain ledger.

FIG. 11 shows two versions of the same blockchain, a first blockchain constructed by the first data center 750, and a second blockchain constructed by the third data center 950. As seen in the figure, the first data center's blockchain includes the block bodies for block 1, block 3, and block 5. This can be a result of the first data center 750 having generated block 1, block 3, and block 5.

In contrast, the third data center 950 does not have the block bodies for block 1, block 3, and block 5. This can be a result of the first data center 750 having sent ledger update messages to the third data center 950 that included block headers but not block bodies. Similarly, the blockchain at the third data center 950 can include the block bodies of block 2, block 4, and block 6, while the blockchain at the first data center 750 may not include these block bodies.

In other embodiments, one of the data centers may be configured to share block bodies. For example, in some embodiments, while the third data center 950 does not receive block bodies from the first data center 750, the third data center 950 may share its block bodies with the first data center 750. This would result in the first data center 750 having all the block bodies, while the third data center 950 would still have half of the block bodies.

As shown in FIG. 11, while both blockchains have an incomplete view of the block bodies, both blockchains include the full set of block headers. This is because, in some embodiments, both data centers can provide one another with block headers that they have generated. This allows both data centers to keep a complete, running list of block headers, even if they do not generate some of the block headers.

Arrows in FIG. 11 demonstrate that the first data center 750 can send header 1 to the third data center 950, that the third data center 950 can send header 2 to the first data center 750, and so forth. Additional arrows demonstrate how each header can be used as a part of the block body in the subsequent block, and then how the subsequent block can be used to generate the subsequent header. For example, the third data center 950 can incorporate header 1 (received from the first data center 750) into the block body of block 2. Then, the third data center 950 can create the block header of block 2 based on its block body. As a result, through data center cooperation, each block in the blockchain can reference the block immediately previous.

In some embodiments, while the data centers may not share sensitive transaction information, the data centers may share the previous block header in addition to the current block header. Thus, the data centers may send a portion of the block body along with the block header. For example, when the third data center 950 sends header 2 (which the third data center 950 generated) to the first data center 750, the third data center 950 can also include header 1 (which the third data center 950 generated) in the message. As a result, the first data center 750 can confirm that header 2 belongs to a block that is subsequent to block 1, where the first data center 750 left off. Otherwise, when assembling the blockchain blocks, the first data center 750 can simply trust (e.g., based on programmed update message synchronization) that header 2 belongs to a block that immediately follows and refers to block 1.

In FIG. 11, the two data centers alternate block generation for every other block. However, embodiments allow the data centers to trade off block generation in other manners and patterns. For example, the first data center 750 could generate two or more blocks in a row, and then send headers for both blocks to the third data center 950. The third data center 950 could wait to generate a new block until it receives an update from the first data center 750.

Additionally, more data centers can be involved in this blockchain updating process. For example, if another data center were added to FIG. 11, each data center could generate every third block.

As explained above, embodiments of the invention allow distributed data centers can be used for recording any suitable type of data element. For example, data elements representing updated medical information, information about a newly issued college degree, exam results, vehicle registration data, signed waivers, and/or any other suitable type of recordable information can be tracked and recorded. Any suitable type of digital record can be used to document a new data element. Any suitable types of data element record can be shared between data centers, though some data centers may only release record identifiers, and not record information.

One embodiment of the invention is directed to a method. The method comprises processing, by a first data center computer, a first data element, and creating a first record of the first data element in a first database. The method also includes sending a message to a second data center computer indicating that the first record was created. The second data center computer updates a second database based on the message.

Another embodiment of the invention is directed to a first data center computer configured to perform the above-described method.

Another embodiment of the invention is directed to a method comprising processing, by a first data center computer, a first data element, and creating a first record of the first data element in a first database. The method also includes sending first a message to a second data center computer indicating that the first record was created. The method also includes receiving a second message from the second data center computer indicating that a second record for a second data element was created by the second data center computer, and updating the first database based on the second message. The method further comprises receiving, by a second data center computer, the first message from the first data center computer indicating that the first record was created, and updating a second database based on the first message. The method also includes processing the second data element, creating the second record for the second data element in the second database, and sending the second message to the first data center computer indicating that the second record was created.

Another embodiment of the invention is directed to a system including a first data center computer and a second data center computer configured to perform the above-described method.

Another embodiment of the invention is directed to a method. The method comprises processing, by a first data center computer, a first digital asset that indicates the transfer of a value from a sender to a recipient. The method further includes recording the first digital asset in a first database, and sending a message to a second data center computer indicating that the first digital asset was recorded. The second data center computer updates second database based on the message.

In some embodiments, the message sent to the second data center computer includes the digital asset, and the second data center records the first digital asset in a second database. Also, the first database and the second database include a matching set of digital asset records.

In other embodiments, recording the first digital asset in the first database includes generating a first block for a first blockchain, the first block including a header and digital asset information. The message sent to the second data center computer includes the header but does not include the digital asset information. The second data center generates a second block for a second blockchain, the second block including the header but not including the digital asset information. Thus, the first block and the second block include the same header. The first database and the second database may include a matching set of block headers, but not a matching set of digital asset information. Also the header can be generated based on a hash of the digital asset information. The digital asset information can include information about the value, information about the sender, and information about the recipient. The value can include an access privilege.

The method can further include receiving, by the first data center computer, a second digital asset from the second data center computer. The second data center computer processed the second digital asset and added the second digital asset to the second database. The method also comprises validating the second digital asset, and recording the second digital asset in the first database. The method can further include receiving the first digital asset, wherein the first digital asset is initially received and processed only by the first data center computer, and wherein the second digital asset is initially received and processed only by the second data center computer. Additionally, the second data center computer can validates the first digital asset before recording the first digital asset in the second database.

Another embodiment of the invention is directed to a first data center computer configured to perform the above-described method.

Another embodiment of the invention is directed to a method comprising processing, by a first data center computer, a first digital asset that indicates the transfer of a value from a sender to a recipient. The method also includes recording the first digital asset in a first database, and sending a first message to a second data center computer indicating that the first digital asset was recorded. The method further comprises receiving a second message from the second data center computer indicating that a second digital asset was recorded by the second data center computer, and updating the first database based on the second message. The method additional includes receiving, by a second data center computer, the first message from the first data center computer indicating that the first digital asset was recorded, and then updating a second database based on the first message. The second data center computer can also process the second digital asset, recording the second digital asset in the second database, and send the second message to the first data center computer indicating that the second digital asset was recorded. The first database and the second database can include matching data.

In some embodiments, the first message sent to the second data center computer includes the first digital asset, and the second data center records the first digital asset in a second database. Also, the second message includes the second digital asset, and updating the first database based on the second message includes recording the second digital asset in the first database. Further, the first database and the second database include a matching set of digital asset records.

In other embodiments, recording the first digital asset in the first database includes generating a first block for a first blockchain, the first block including a header and digital asset information. The message sent to the second data center computer includes the header but does not include the digital asset information. The second data center generates a second block for a second blockchain, the second block including the header but not including the digital asset information. Thus, the first block and the second block include the same header. The first database and the second database may include a matching set of block headers, but not a matching set of digital asset information. Also the header can be generated based on a hash of the digital asset information. The digital asset information can include information about the value, information about the sender, and information about the recipient. The value can include an access privilege.

The method can further include receiving, by the first data center computer, a second digital asset from the second data center computer. The second data center computer processed the second digital asset and added the second digital asset to the second database. The method also comprises validating the second digital asset, and recording the second digital asset in the first database. The method can further include receiving the first digital asset, wherein the first digital asset is initially received and processed only by the first data center computer, and wherein the second digital asset is initially received and processed only by the second data center computer. Additionally, the second data center computer can validates the first digital asset before recording the first digital asset in the second database.

Another embodiment of the invention is directed to a system including a first data center computer and a second data center computer configured to perform the above-described method.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimd is:

1. A method comprising:
   receiving, by a first data center computer, a digital asset transfer request comprising a first digital asset comprising a first digital signature of a sending entity;
   generating, by the first data center computer, a second digital signature of the first digital asset;
   updating, by the first data center computer, a first database to include the first digital asset, wherein updating the first database to include the first digital asset includes creating a first record in the first database, the first record including the first digital asset and a first record identifier;
   transmitting, by the first data center computer, a first message with information about the update to the first database to include the first digital asset to a second data center computer, the first message including the first record identifier but not the first digital asset, wherein the second data center computer validates the information about the update to the first database to include the first digital asset and then records the information about the update to the first database in a second database by creating a second record in the second database, the second record including the first record identifier and not the first digital asset, and wherein the second data center computer does not receive the first digital asset;
   receiving, by the first data center computer, a second message from the second data center computer, the second message indicating that a third record was created by the second data center computer, the second message including a third record identifier of the third record but not a second digital asset of the third record, and wherein the first data center computer does not receive the second digital asset; and creating, by the first data center computer, a fourth record in the first database, the fourth record including the third record identifier and not the second digital asset.

2. The method of claim 1, wherein the first record identifier is a hash, and further comprising:

generating, by the first data center computer, the hash based on first digital asset.

3. The method of claim 1, wherein the first database comprises a first blockchain, the second database comprises a second blockchain, and the first record identifier is a block header.

4. The method of claim 3, wherein the first record identifier identifies the first record but does not provide any information about the first digital asset.

5. The method of claim 1, wherein the first database and the second database have common record identifiers but in different sequences.

6. The method of claim 1, wherein the first database and the second database have a matching set of record identifiers in a matching sequence.

7. The method of claim 1, wherein the first database and the second database do not have a matching set of digital assets.

8. The method of claim 1, wherein the digital asset transfer request is received by the first data center computer from a routing computer, wherein the second data center computer receives a second digital asset transfer request comprising the second digital asset.

9. The method of claim 8, wherein the first digital asset is received only by the first data center computer, and the second digital asset is received only by the second data center computer.

10. A first data center computer comprising:

a processor; and a non-transitory computer readable medium comprising code executable by the processor, for implementing a method comprising:

receiving a digital asset transfer request comprising a first digital asset comprising a first digital signature of a sending entity;

generating a second digital signature of the first digital asset;

updating a first database to include the first digital asset, wherein updating the first database to include the first digital asset includes creating a first record in the first database, the first record including the first digital asset and a first record identifier;

transmitting a first message with information about the update to the first database to include the first digital asset to a second data center computer, the first message including the first record identifier but not the first digital asset, wherein the second data center computer validates the information about the update to the first database to include the first digital asset and then records the information about the update to the first database in a second database by creating a second record in the second database, the second record including the first record identifier and not the first digital asset, and wherein the second data center computer does not receive the first digital asset;

receiving a second message from the second data center computer, the second message indicating that a third record was created by the second data center computer, the second message including a third record identifier of the third record but not a second digital asset of the third record, and wherein the first data center computer does not receive the second digital asset and creating a fourth record in the first database, the fourth record including the third record identifier and not the second digital asset.

11. The first data center computer of claim 10, wherein the method further comprises:

sending a response to the sending entity indicating that the first digital asset was successfully processed.

12. The first data center computer of claim 10, wherein the first database comprises a first blockchain, and wherein creating the first record in the first database comprises:

generating a first block for the first blockchain, the first block being the first record.

13. The first data center computer of claim 12, wherein the first block comprises a block header and a block body, the block header is the first record identifier, and the block body includes the first digital asset.

14. The first data center computer of claim 10, wherein the second database comprises a second blockchain, the second record is a second block in the second blockchain, the second block comprises a second block header that includes the first record identifier, and the second block does not have a block body.

15. The first data center computer of claim 10, wherein the first record identifier is a number or a title.

16. The first data center computer of claim 10, wherein the second digital signature is created by signing the first digital asset with a private key of the first data center computer.

17. The first data center computer of claim 10, wherein the first record identifier is a first hash, the third record identifier is a third hash, and further comprising:

generating, by the first data center computer, the first hash based on first digital asset, wherein the second data center computer generates the third hash based on the second digital asset and the first hash.

18. The first data center computer of claim 10, wherein the method further comprises:

generating, by the first data center computer, the first record identifier based on first digital asset, wherein the second data center computer generates the third record identifier based on the second digital asset and the first record identifier.

19. The first data center computer of claim 10, wherein the first digital asset comprises information regarding a transfer of value from the sending entity to a recipient entity.

* * * * *